United States Patent
Kwon et al.

(10) Patent No.: US 9,413,501 B2
(45) Date of Patent: Aug. 9, 2016

(54) METHOD AND APPARATUS FOR ALLOCATING RESOURCES FOR COMMUNICATION BETWEEN BASE STATIONS

(71) Applicant: Samsung Electronics Co., Ltd., Suwon-si, Gyeonggi-do (KR)

(72) Inventors: Sang-Wook Kwon, Yongin-si (KR); Hyun-Jeong Kang, Seoul (KR); Ha-Kyung Jung, Seoul (KR); Sang-Jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 14/260,671

(22) Filed: Apr. 24, 2014

(65) Prior Publication Data

US 2014/0321419 A1   Oct. 30, 2014

(30) Foreign Application Priority Data

Apr. 26, 2013 (KR) ........................ 10-2013-0046611

(51) Int. Cl.
*H04L 5/00* (2006.01)
*H04W 84/18* (2009.01)

(52) U.S. Cl.
CPC ............ *H04L 5/0032* (2013.01); *H04L 5/0005* (2013.01); *H04W 84/18* (2013.01)

(58) Field of Classification Search
CPC .................................................... H04W 84/18
See application file for complete search history.

(56) References Cited

U.S. PATENT DOCUMENTS

| 5,970,410 | A | 10/1999 | Carney et al. |
| 2007/0297371 | A1 | 12/2007 | Lea |
| 2008/0132240 | A1 | 6/2008 | Baek et al. |
| 2008/0167003 | A1* | 7/2008 | Wang ............... H04W 12/04 455/411 |
| 2008/0198798 | A1 | 8/2008 | Wu et al. |
| 2009/0252088 | A1 | 10/2009 | Rao et al. |
| 2011/0222460 | A1 | 9/2011 | Fahldieck |
| 2012/0063417 | A1* | 3/2012 | Redana ............. H04W 36/12 370/331 |
| 2014/0120927 | A1* | 5/2014 | Liu .................. H04W 76/02 455/450 |

* cited by examiner

*Primary Examiner* — John Blanton
(74) *Attorney, Agent, or Firm* — Jefferson IP Law, LLP

(57) ABSTRACT

A method and an apparatus for allocating resources for communication between BSs are provided. The method includes when a new BS is added to a network, determining neighboring BSs of the new BS based on position information of the new BS and position information of existing BSs in the network, determining whether to use a second resource allocation scheme based on a first resource allocation scheme currently applied to the existing BSs in the network and a number of resource configurations used by the neighboring BSs, when it is determined to use the second resource allocation scheme, determining resource allocations for communication between the new BS and the neighboring BSs by using the second resource allocation scheme, and when it is determined to not use the second resource allocation scheme, determining resource allocations for communication between the new BS and the neighboring BSs by using the first resource allocation scheme.

16 Claims, 18 Drawing Sheets

| BS ID | # of RF chains | RF chain index | Location information | |
|---|---|---|---|---|
| BS X | 6 | 1, 2, 3, 4, 5, 6 | Latitude | 34° |
| | | | Longitude | 128° |
| | | | Altitude | 540m |

FIG.6

| BS ID | # of RF chains | RF chain Index | Connection Info | Resource allocation map |
|---|---|---|---|---|
| BS 1 | 6 | 1 | BS2 | A (2) |
| | | 2 | BS3 | B (2) |
| | | 3 | BS4 | C (2) |
| ... | ... | ... | ... | ... |

FIG.7

< 1 configuration : A >

< 2 configurations : A,B >

< 2 configurations : AC,BD >

< 3 configurations : AC,BC,AD >

< 4 configurations : AC,AD,BC,BD >

METHOD AND APPARATUS FOR ALLOCATING RESOURCES FOR COMMUNICATION BETWEEN BASE STATIONS

CROSS-REFERENCE TO RELATED APPLICATION(S)

This application claims the benefit under 35 U.S.C. §119 (a) of a Korean patent application filed on Apr. 26, 2013 in the Korean Intellectual Property Office and assigned Serial number 10-2013-0046611, the entire disclosure of which is hereby incorporated by reference.

TECHNICAL FIELD

The present disclosure relates to point-to-multipoint communication of a wireless communication system. More particularly, the present disclosure relates to a method and an apparatus for allocating resources for point-to-multipoint communication.

BACKGROUND

A cellular wireless communication system divides an entire service area into a plurality of geographical areas, that is, cells and covers each of the cells, so as to serve terminals within each corresponding cell. Each Base Station (BS) may connect terminals within the cell of the BS itself with a terminal of another BS or connect the terminals through a gateway.

In a communication system, a BS and another BS, or a BS and a gateway, may be connected through a core network in a point-to-point manner. For such a connection, substantial hardware is required.

FIG. 1 illustrates a point-to-point connection of BSs in a general communication system according to the related art.

Referring to FIG. 1, a plurality of BSs 2 to 19 located in a vicinity of BS 1 may be connected to BS 1 through backhaul links. Each of the BSs is connected to other BSs through a core network in a point-to-point scheme. For example, BS 1 and BS 11 are connected through a backhaul link in a point-to-point scheme. Similarly, BS 1 is connected to other BSs through inherent links.

When the BSs are connected in the point-to-point scheme, the BSs use different hardware units to communicate with different BSs, through a wire or wirelessly. For example, BS 1 requires 18 hardware units to be connected to 18 different BSs within 3 tiers in the point-to-point scheme.

In a general BS design, excessive hardware requirements unnecessarily increase complexity and cost of the BS to hinder miniaturization of the BS. Further, in cooperative communication serving one terminal in cooperation with a plurality of BSs, the BSs are required to dynamically or adaptively support a backhaul link to reflect states of access links with the terminal. Currently, due to the excessive hardware demand, a quick and accurate service cannot be performed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus in which a communication system allocates resources for communication between Base Stations (BSs).

Another aspect of the present disclosure is to provide a method and an apparatus for allocating resources to BSs for point-to-multipoint communication among a plurality of BSs.

Another aspect of the present disclosure is to provide a method and an apparatus for efficiently allocating resources for communication between BSs by adaptively changing a resource allocation scheme of a communication link according to a communication environment.

In accordance with an aspect of the present disclosure, a method of allocating resources for communication between BSs is provided. The method includes, when a new BS is added to a network, determining neighboring BSs of the new BS based on position information of the new BS and position information of existing BSs in the network, determining whether to use a second resource allocation scheme based on a first resource allocation scheme currently applied to the existing BSs in the network and a number of resource configurations used by the neighboring BSs, when it is determined to use the second resource allocation scheme, determining resource allocations for communication between the new BS and the neighboring BSs by using the second resource allocation scheme, and when it is determined to not use the second resource allocation scheme, determining resource allocations for communication between the new BS and the neighboring BSs by using the first resource allocation scheme.

In accordance with another aspect of the present disclosure, an apparatus for allocating resources for communication between BSs is provided. The apparatus includes a BS interface unit configured to receive a resource allocation request including position information from a new BS and to transmit resource allocation information to the new BS or the new BS and currently existing BSs in a network, a storage unit configured to store resources and position information of the new BS and the existing BSs in the network, and a resource allocator configured to determine neighboring BSs of the new BS based on the position information of the new BS and the position information of the existing BSs in the network, to determine whether to use a second resource allocation scheme based on a first resource allocation scheme currently applied to the existing BSs in the network and a number of resource configurations used by the neighboring BSs, to determine resource allocations for communication between the new BS and the neighboring BSs by using the second resource allocation scheme when it is determined to use the second resource allocation scheme, and to determine resource allocations for communication between the new BS and the neighboring BSs by using the first resource allocation scheme when it is determined to not use the second resource allocation scheme.

In accordance with another aspect of the present disclosure, a method of allocating resources for communication between BSs is provided. The method includes, when a new BS is added to a network, transmitting a request message including position information of the new BS to neighboring BSs from the new BS, receiving a response message corresponding to the request message from a first BS of the neighboring BSs, determining resource allocation to be used for a connection between the first BS and the new BS in consideration of a resource allocation set of the first BS and a resource allocation set of the new BS, and transmitting a confirm message indicating the determined resource allocation to the first BS.

In accordance with another aspect of the present disclosure, an apparatus for allocating resources for communication between BSs is provided. The apparatus includes a transmitter configured to, when a new BS is added to a network, transmit a request message including position information of the new BS to neighboring BSs, a receiver configured to receive a response message corresponding to the request message from a first BS of the neighboring BSs, and a resource allocator configured to determine resource allocation to be used for a connection between the first BS and the new BS in consideration of a resource allocation set of the first BS and a resource allocation set of the new BS and to transmit a confirm message indicating the determined resource allocation to the first BS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates a format of information which a newly installed BS reports to a BS managing server according to an embodiment of the present disclosure;

FIG. 7 illustrates a format of resource allocation information which a BS managing server reports to each of BSs according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure described below describe resource allocating methods for configuring wireless communication between Base Stations (BSs) included in a wireless cellular communication system. Wireless communication between BSs may be used to exchange adjacent BS information between BSs or information on a terminal which is communicating. Particularly, when a plurality of BSs simultaneously provides services to a terminal without passing through a core network, point-to-multipoint communication between the BSs is advantageously used.

Figure 1:
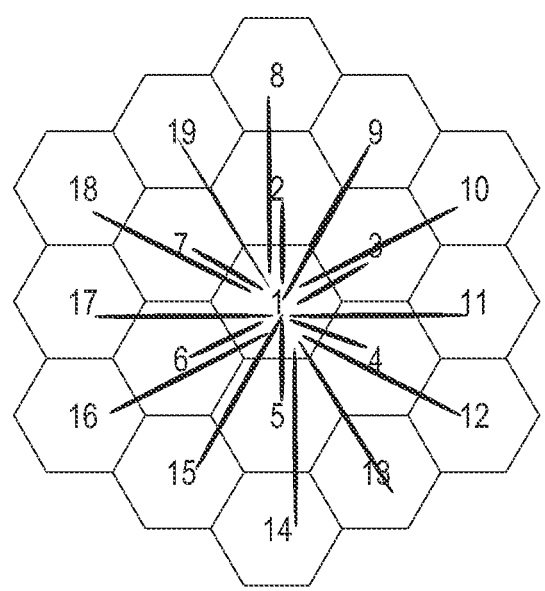
FIG. 1 illustrates a point-to-point connection between Base Stations (BSs) in a general communication system according to an embodiment of the present disclosure.
Figure 2:
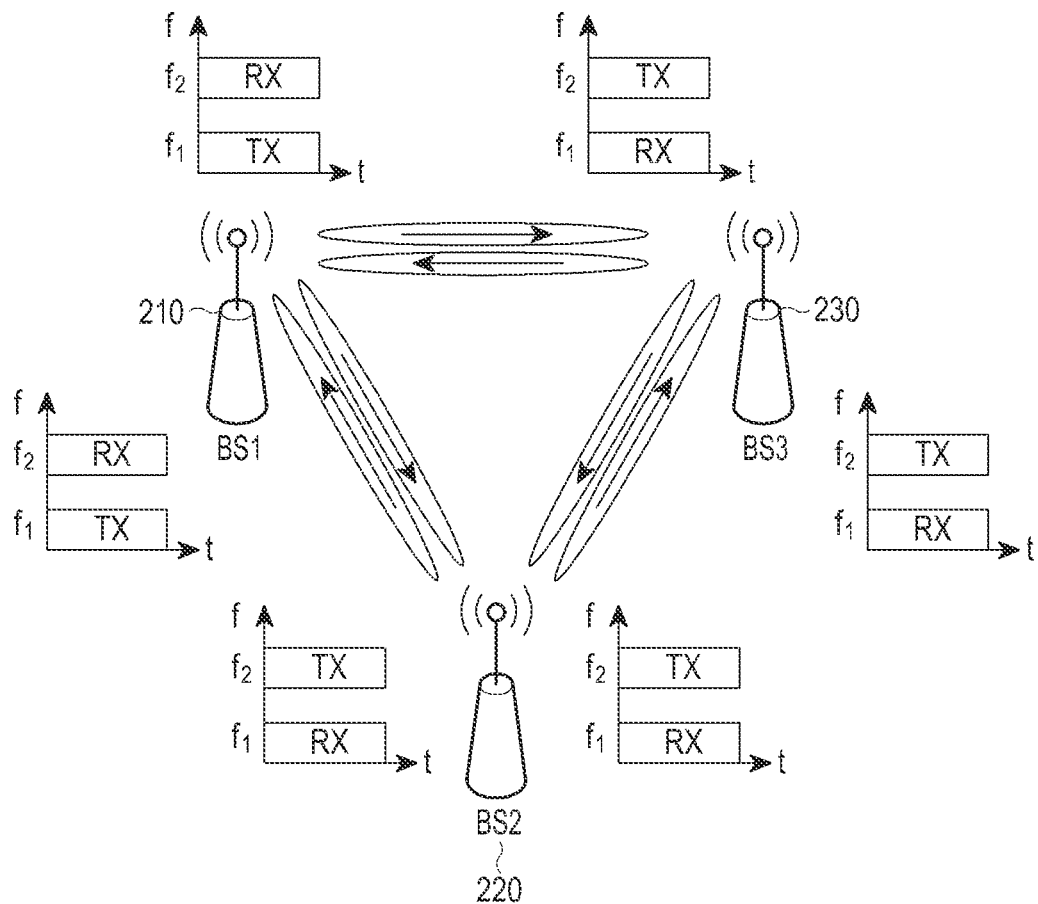
FIG. 2 illustrates a network structure using fixed resource allocation for communication between BSs according to an embodiment of the present disclosure.

FIG. 2 illustrates a network structure using fixed resource allocation for communication between BSs according to an embodiment of the present disclosure. An example in which the same fixed resources are used between BSs for communication with counterpart BSs will be described herein.

Referring to FIG. 2, three BSs including BS1 210, BS2 220, and BS3 230 located in the vicinity of each other are illustrated, and the BSs 210 to 230 perform wireless communication with each other by using fixed frequency bands. Each of the BSs fixedly receives a transmission resource and a reception resource from a frequency domain and uses the resources for communication between BSs. Specifically, BS1 210 uses a frequency band f1 as the transmission resource and a frequency band f2 as the reception resource. BS2 220 and BS3 230 use the frequency band f1 as the reception resource and use the frequency band f2 as the transmission resource.

When the resources are allocated as described above, communication between BS1 210 and BS2 220 and communication between BS1 210 and BS3 230 are possible, but communication between BS2 220 and BS3 230 is not possible. This is because BS2 220 and BS3 230 attempt to transmit or receive a signal by using the same frequency band as each other. That is, both BS2 220 and BS3 230 attempt to transmit on frequency band f2 and to receive on frequency band f1.

As described above, when the fixed resources are allocated to the BSs for the communication between the BSs, the following problems may occur. That is, downlink and uplink can be distinguished in communication between the terminal and the BS, but downlink and uplink cannot be distinguished in communication between the BSs. For example, when a first BS A transmits data to a second BS B, a transmission link in the BS A side corresponds to a reception link in the BS B side.

Accordingly, for the communication between the BSs, variable resource allocation for each link is preferable over the fixed resource allocation.

Figure 3:
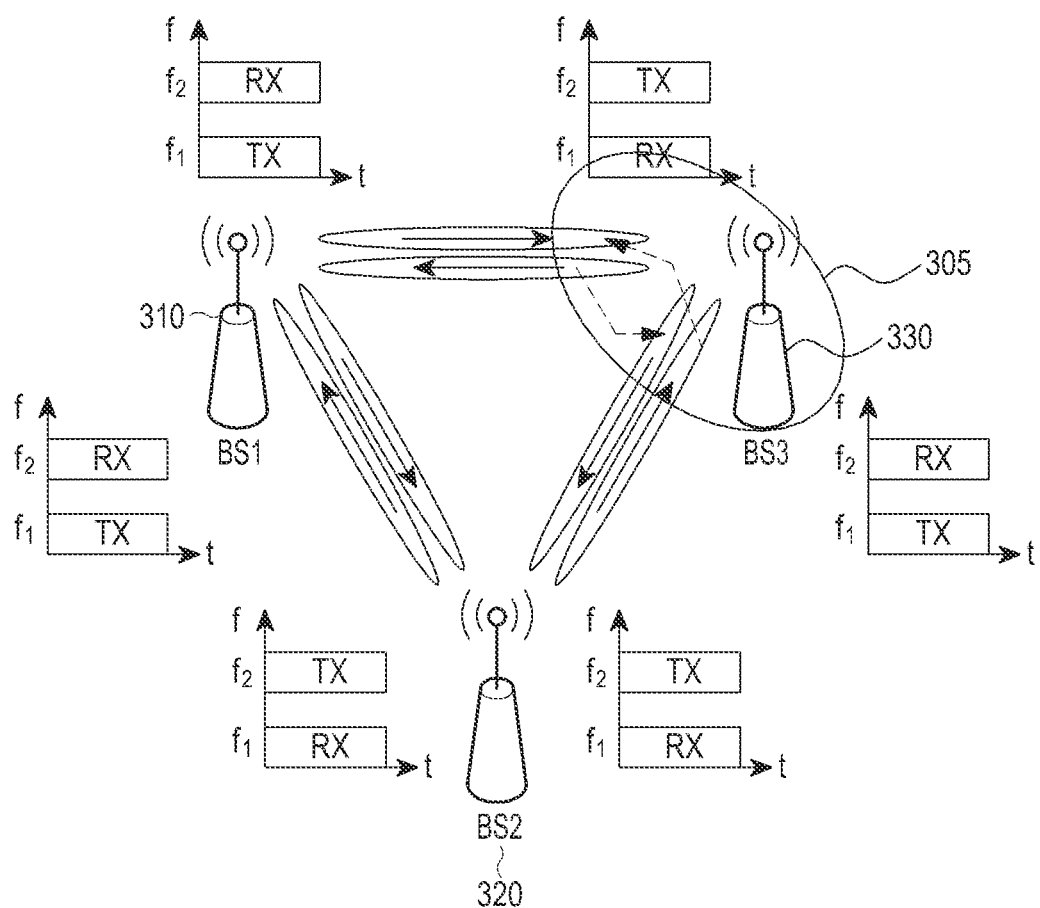
FIG. 3 illustrates a network structure using variable resource allocation for the communication between BSs according to an embodiment of the present disclosure.

FIG. 3 illustrates a network structure using variable resource allocation for the communication between BSs according to an embodiment of the present disclosure. The BSs may use different resources for the communication between different BSs.

Referring to FIG. 3, BS1 310 uses a frequency band f1 for the purpose of transmission to BS2 320, a frequency band f2 for the purpose of reception for communication with BS2 320, and also uses the frequency band f1 for the purpose of transmission and the frequency band f2 for the purpose of reception for communication with BS3 330. BS2 320 uses the frequency band f1 for the purpose of reception and the frequency f2 for the purpose of transmission for communication with BS1 310, and uses the frequency band f1 for the purpose of reception and the frequency band f2 for the purpose of transmission for communication with BS3 330. BS3 330 uses the frequency band f2 for the purpose of transmission and the frequency f1 for the purpose of reception for communication with BS1 310, and uses the frequency band f2 for the purpose of reception and the frequency band f1 for the purpose of transmission for communication with BS2 320.

In the above described case, BS3 330 simultaneously performs transmission and reception by using the frequency bands f1 and f2. In other words, BS3 330 simultaneously transmits a signal to BS1 310 by using the frequency band f2 and receives a signal from BS2 320 by using the frequency band f2. Further, BS3 330 simultaneously transmits a signal to BS2 320 by using the frequency band f1 and receives a signal from BS 1 310 by using the frequency band f1.

The signals transmitted by BS3 330 flow to reception antenna sides of the BS3 330, and accordingly, a problem of loop interference 305 causing interference to the signals received from other BSs occurs. More specifically, when BS3 330 transmits the signal to BS2 320 through the frequency band f1, BS3 330 also attempts to receive the signal from BS1 310 through the frequency band f1. Accordingly, the signal transmitted to BS2 320 causes interference with regard to the signal received from BS1 310. Similarly, the signal which BS3 330 transmits to BS1 through the frequency band f2 causes interference to the signal which BS3 330 receives from BS2 320 through the frequency band f2.

In an embodiment described below, for communication among a plurality of BSs, a network entity that stores information of BSs, particularly resource allocation information, and calculates and notifies of resources required by each BS for communication with neighboring BSs based on the information, is provided. The entity may be configured as a separate network device such as a Self Organizing Network (SON) server connected to a plurality of BSs, or may be implemented within one of the BSs. Hereinafter, the entity will be referred to as a BS managing server.

The BS managing server collects new BS information from a newly installed BS, allocates communication resources between BSs to the new BS or communication resources to the new BS and neighboring BSs based on the collected information and information of the neighboring BSs, and notifies the new BS or the new BS and the neighboring BSs of the allocated resources.

Figure 4:
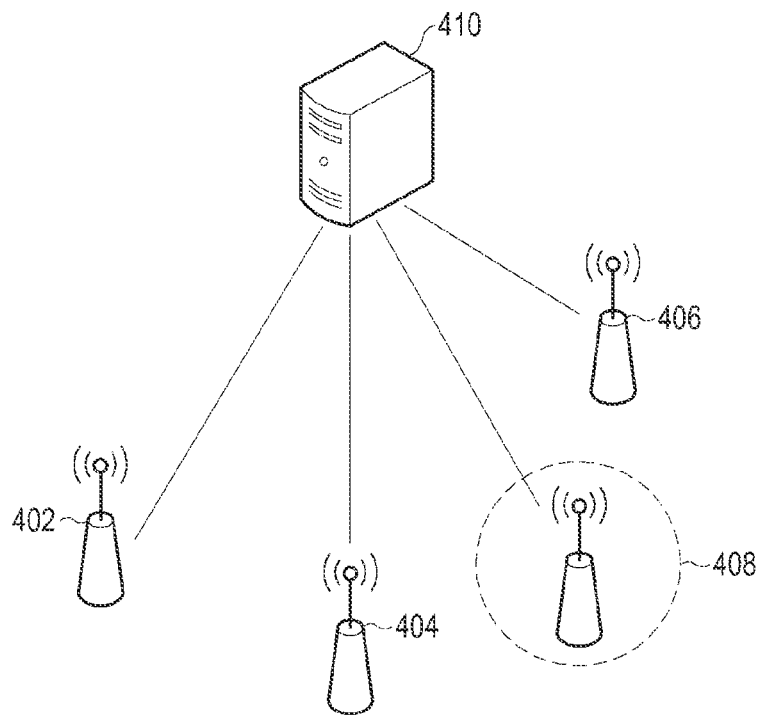
FIG. 4 illustrates an example of a system structure for allocating resources between BSs according to an embodiment of the present disclosure.

FIG. 4 illustrates an example of a system structure for allocating resources between BSs according to an embodiment of the present disclosure.

Referring to FIG. 4, a BS managing server 410 is connected to a plurality of BSs 402, 404, and 406 wirelessly or through a wire, and stores and manages information on radio frequency resources used by the BSs 402, 404, and 406 for communication with each other. When a new BS 408 is added to the network, the BS managing server 410 collects required information (hereinafter referred to as BS report information) from the new BS 408 and determines resources for the new BS 408, or resources for the new BS 408 and the neighboring BSs 402, 404, and 406, based on pre-stored information of the neighboring BSs 402, 404, and 406 and the BS report information of the new BS 408. The determined resources are notified to the corresponding BSs 402 to 408.

Figure 5:
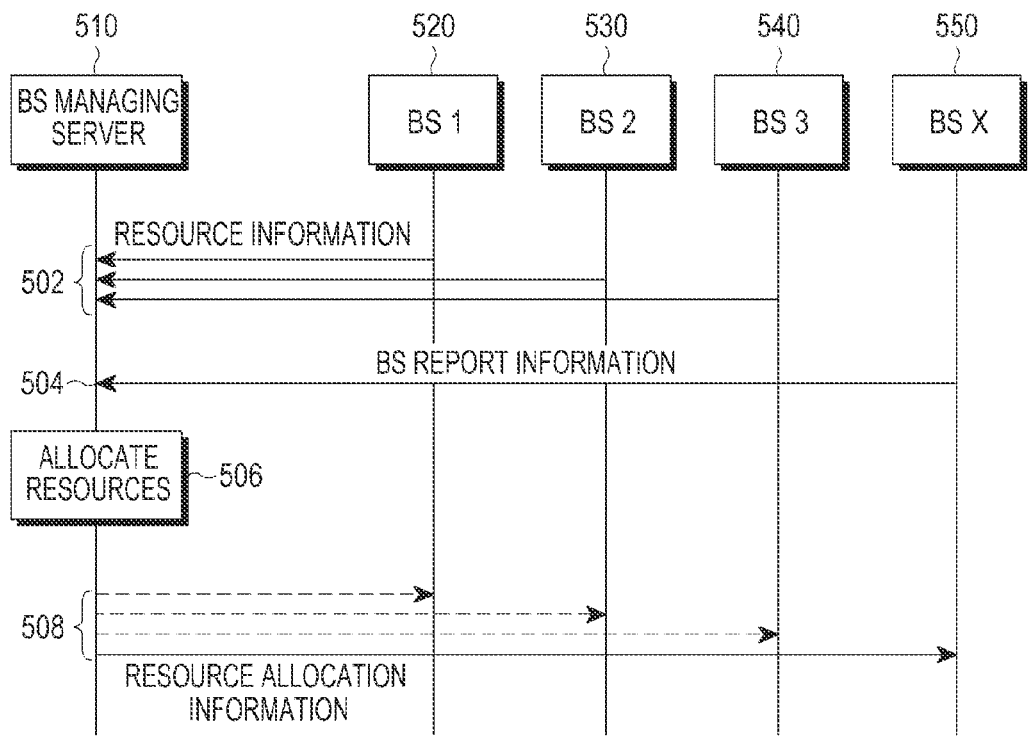
FIG. 5 is a message flow diagram illustrating a resource allocating process for communication between BSs according to an embodiment of the present disclosure.

FIG. 5 is a message flow diagram illustrating a resource allocating process for the communication between BSs according to an embodiment of the present disclosure.

Referring to FIG. 5, the BS managing server 510 collects resource information of respective BSs from a plurality of BSs including BS 1 520, BS2 530, and BS 3 540 managed by the BS managing server in operation 502. The resource information refers to radio frequency resources (for example, frequency bands) used by the corresponding BS for communication with each of the neighboring BSs. For example, each of the BSs may report its own resource information to the BS managing server 510 according to a periodic or predetermined event. In another embodiment, when each of the BSs is installed or the BS managing server 510 is installed, the BS managing server 510 may receive resource information of each of the BSs from each of the BSs or receive the resource information from a system operator.

When BS X 550 corresponding to a new BS is installed, in operation 504 BS X 550 transmits BS report information to the BS managing server 510 to make a request for allocating resources required for communication between BSs. The BS report information may be carried on a resource allocation request message or may be transmitted to the BS managing server 510 together with the resource allocation request message. In operation 506, the BS managing server 510 allocates resource for BS X 550 and/or neighboring BSs BS 1 520, BS 2 530, and BS 3 540 such that frequency bands do not overlap each other or interference is not generated among the BSs, based on pre-stored resource/position information of the neighboring BSs and the BS report information transmitted from BS X 550.

In operation 508, the BS managing server 510 transmits resource allocation information indicating resources allocated according to a result of the resource allocation to BS X 550 and/or neighboring BSs BS 1 520, BS 2 530, and BS 3 540. The resource allocation information may be carried on a separate resource allocation message and then transmitted to each of the BSs.

FIG. 6 illustrates a format of information which a newly installed BS reports to the BS managing server according to an embodiment of the present disclosure.

Referring to FIG. 6, the BS report information may include at least one of a BS IDentification (ID), a number of Radio Frequency (RF) chains, indexes of used RF chains, and BS location/position information. In the embodiment of FIG. 6, a newly installed BS X has six RF chains, the indexes of the RF chains are 1, 2, 3, 4, 5, and 6, and a latitude/longitude/altitude of a position where BS X is installed is 34°/128°/540 m.

FIG. 7 illustrates a format of resource allocation information which the BS managing server reports to each of the BSs according to an embodiment of the present disclosure.

Referring to FIG. 7, the resource allocation information includes a BS ID, a number of RF chains, RF chain indexes, access/connection information, and a resource allocation map. The resource allocation information may indicate only allocation resources for the newly installed BS, or may indicate all allocation resources for the newly installed BS and the neighboring BSs. In the embodiment of FIG. 7, the resource allocation information shows resource allocation of BS 1 having three RF chains and each resource allocation is indicated by a type. That is, RF chain index 1 of BS 1 is connected to BS 2 and a frequency resource used for a connection link therebetween is an "A(2)" type. RF chain index 2 of BS 1 is connected to BS 3 and a frequency resource used for a connection link therebetween is a "B(2)" type. RF chain index 3 of BS 1 is connected to BS 4 and a frequency resource used for a connection link therebetween is a "C(2)" type. A detailed description of types indicating allocation resources will be made below.

Figure 8:
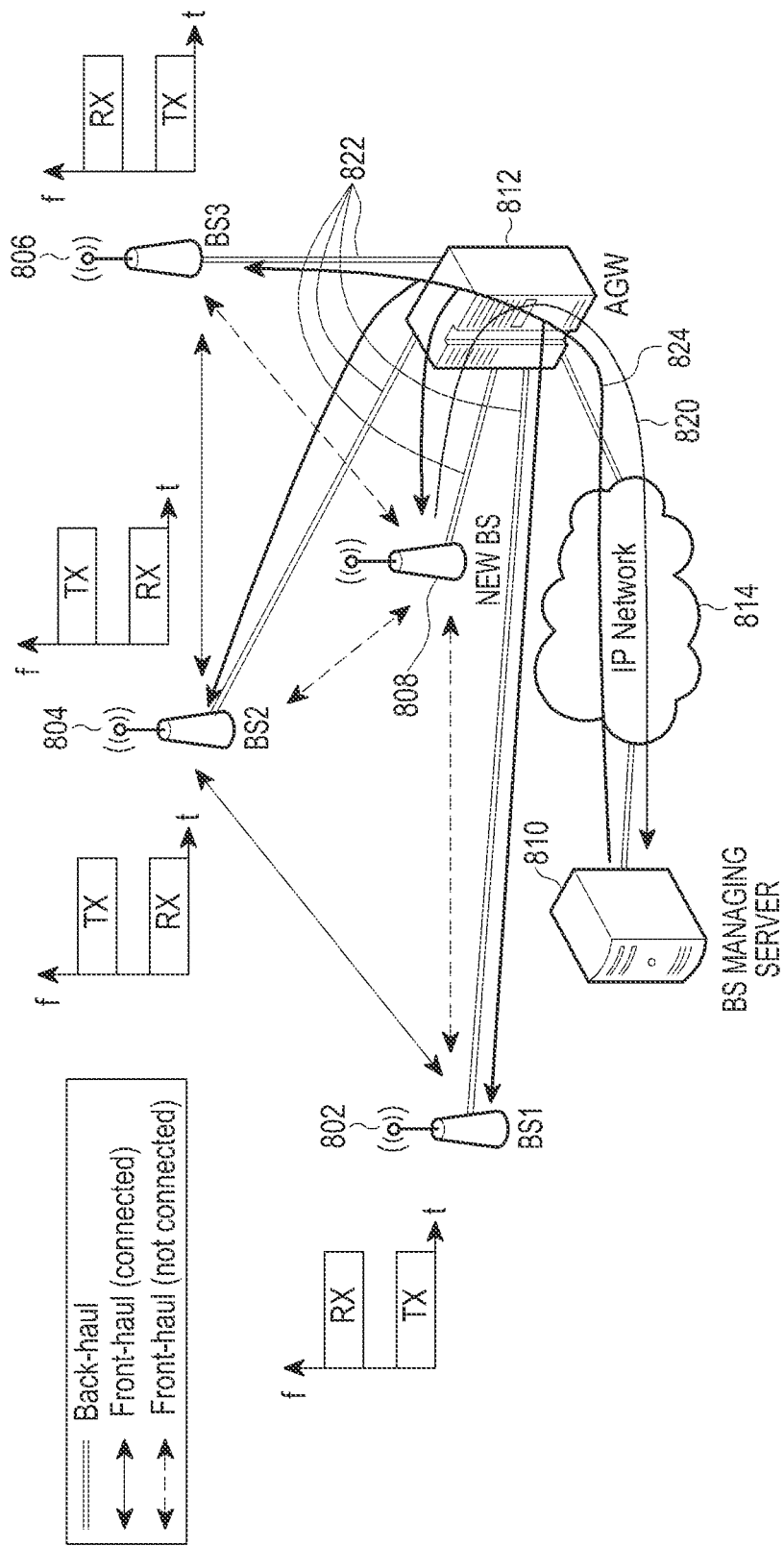
FIG. 8 illustrates a process of performing communication between BSs in a wireless communication system according to an embodiment of the present disclosure.

FIG. 8 illustrates a process of performing communication between BSs in a wireless communication system according to an embodiment of the present disclosure.

Referring to FIG. 8, BS1 802, BS2 804, and BS3 806 perform communication between BSs by using previously allocated resources and an Access GateWay (AGW) 812 connects the BSs 802, 804, and 806 to a BS managing server 810 through an Internet Protocol (IP) network 814, as indicated by a reference numeral 820. Existing BSs 1, 2, and 3 802, 804, and 806 may communicate with the AGW 812 and the server 810 through back-haul links and communicate with each other through front-hauls.

When a new BS 808 is installed, the new BS 808 does not have a front-haul link with existing BSs 1, 2, and 3 802, 804, and 806. Accordingly, the new BS 808 transmits a resource allocation request including BS report information to the BS managing server 810 through the AGW 812. When the BS managing server 810 receives the BS report information from the new BS 808, the BS managing server 810 determines the neighboring BSs 802, 804, and 806 which can communicate with the new BS 808 based on the BS report information of the new BS 808. Based on information of the found neighboring BSs 802, 804, and 806, the BS managing server 810 allocates resources for each of the BSs such that communication is possible among the BSs 802 to 808 including the new BS 808.

The BS managing server 810 informs the neighboring BSs 802, 804, and 806 and the new BS 808, as indicated by reference 824, of changed communication resources for the communication between BSs, through the back-hauls 822.

Hereinafter, resource allocation types available for the communication between BSs will be described.

Radio frequency resources available for the communication between BSs may be time-divided according to a type and then used, and a length of each time division interval, that is, a number of time division intervals is determined according to a number of BSs which desire to receive resource allocation.

A transmission time unit for the communication between BSs is predetermined and two frequency bands are designated for the communication between BSs. As a number of BSs which desire to perform point-to-multipoint communication increases, the transmission time unit is divided into a plurality of time division intervals, and a number of time division intervals is determined according to a number of BSs. When a number of time division intervals increases, a length of each of the time division intervals becomes shorter. In this specification, a number of time division intervals is indicated by a number of a type. That is, a "1" type means that there is no time division, a "2" type means that an entire time unit is divided into two time division intervals, and a "3" type means that the entire time unit is divided in three time division intervals.

When there is a newly installed BS, the BS managing server determines whether an additional time division is required with reference to conditions of neighboring BSs of the new BS and resource allocation of the neighboring BSs. When the resources can be allocated to the new BS by using currently used time division intervals, frequency bands for one of the currently used time division intervals are allocated to the new BS. In contrast, when the resources cannot be allocated to the new BS by using the currently used time division intervals, additional time division is required, and thus resources should be reallocated to all BSs including the new BS. All BSs may refer to BSs of which resource allocation is controlled by the BS managing server (for the same service provider or service providers sharing the same policy) or may refer to BSs requiring a change in resource allocation due to a new BS.

Figure 9A:
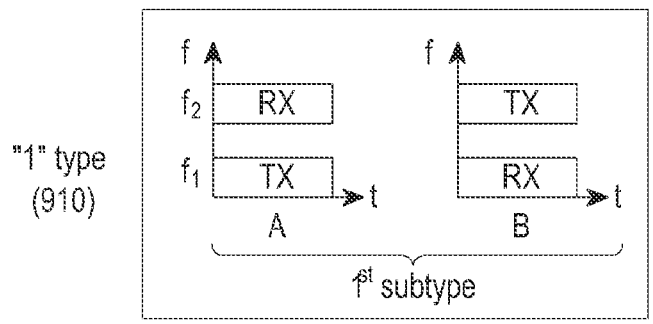
FIGS. 9A, 9B, and 9C illustrate an example of a resource allocation structure for communication between BSs according to an embodiment of the present disclosure.
Figure 9B:
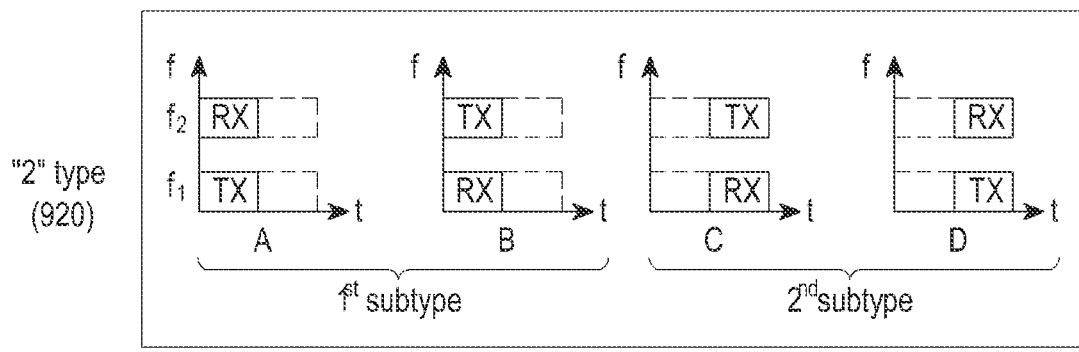
Figure 9C:
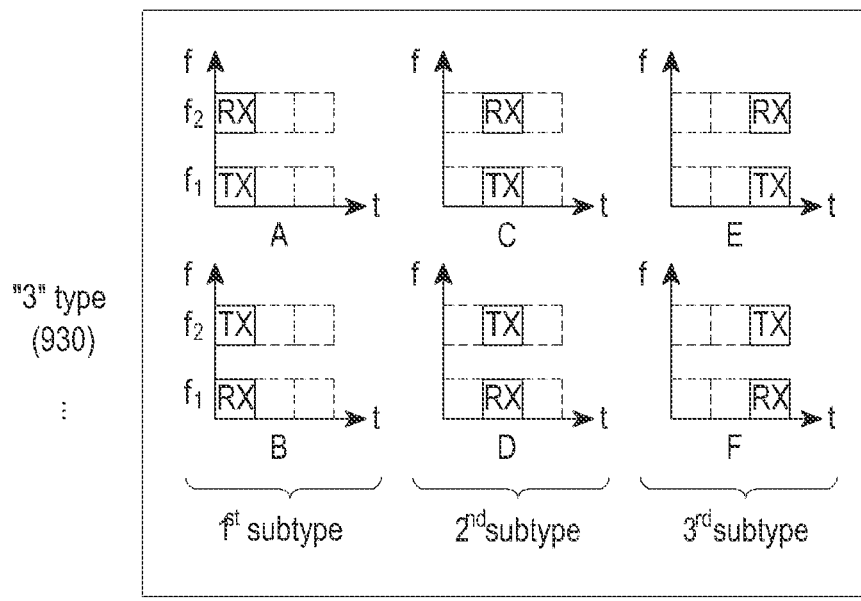

FIGS. 9A, 9B, and 9C (hereinafter commonly called FIG. 9) illustrate an example of a resource allocation structure for the communication between BSs according to an embodiment of the present disclosure.

Referring to FIGS. 9A to 9C, resource allocation schemes are classified based on types and the BS managing server allocates resources corresponding to a predetermined algorithm to each of the BSs. A "k" type means that allocable radio frequency resources are divided into k resources. For example, the allocable radio frequency resources are divided into k time division resources (that is, time division intervals), and accordingly, k refers to a number of time division intervals. Each of the k type resources includes k sub-type resources, each of the k sub-type resources includes a pair of frequency bands (hereinafter referred to as resource allocation) used by two BSs within the same time division interval for communication with each other, and different sub-type resources include resource allocations divided on a time domain. Two resource allocations included in one sub-type resource cannot be simultaneously allocated to one BS.

In the example of FIG. 9A, "1" type resources 910 include "A and B" sub-type resources on one transmission time unit and "A and B" sub-type resources include "A" resource allocation and "B" resource allocation. The "A" resource allocation uses the frequency band f1 for the purpose of transmission and frequency band f2 for the purpose of reception. The "B" resource allocation uses the frequency band f1 for the purpose of reception and frequency band f2 for the purpose of transmission. The "A" and "B" resource allocations of the "1" type may be expressed as "A(1)" and "B(1)", respectively.

Referring to FIG. 9B, "2" type resources 920 include two sub-type resources including "A and B" and "C and D" each of which can be used for a ½ transmission time unit, the "A and B" sub-type resources include "A" resource allocation and "B" resource allocation on a first half transmission time unit, and the "C and D" sub-type resources include "C" resource allocation and "D" resource allocation on a second half transmission time unit. The "A" resource allocation uses the frequency band f1 for the purpose of transmission and frequency band f2 for the purpose of reception on the first half transmission time unit. The "B" resource allocation uses the frequency band f1 for the purpose of reception and frequency band f2 for the purpose of transmission on the first half transmission time unit. The "C" resource allocation uses the frequency band f1 for the purpose of reception and frequency band f2 for the purpose of transmission on the second half transmission time unit. The "D" resource allocation uses the frequency band f1 for the purpose of transmission and frequency band f2 for the purpose of reception on the second half transmission time unit.

Referring to FIG. 9C, "3" type resources 930 include three sub-type resources including "A and B", "C and D", and "E and F", each of which can be used for a ⅓ transmission time unit. The "A and B" sub-type resources include "A" resource allocation and "B" resource allocation on a first ⅓ transmission time unit, the "C and D" sub-type resources include "C" resource allocation and "D" resource allocation on a second ⅓ transmission time unit, and the "E and F" sub-type resources include "E" resource allocation and "F" resource allocation on a third ⅓ transmission time unit. The "A" resource allocation uses the frequency band f1 for the purpose of transmission and frequency band f2 for the purpose of reception on the first ⅓ transmission time unit. The "B" resource allocation uses the frequency band f1 for the purpose of reception and frequency band f2 for the purpose of transmission on the first ⅓ transmission time unit. The "C" resource allocation uses the frequency band f1 for the purpose of reception and frequency band f2 for the purpose of transmission on the second ⅓ transmission time unit. The "D" resource allocation uses the frequency band f1 for the purpose of reception and frequency band f2 for the purpose of transmission on the second ⅓ transmission time unit. The "E" resource allocation uses the frequency band f1 for the purpose of transmission and frequency band f2 for the purpose of reception on the third ⅓ transmission time unit. The "F" resource allocation uses the frequency band f1 for the purpose of reception and frequency band f2 for the purpose of transmission on the third ⅓ transmission time unit.

Although not illustrated, resources of a type higher than the "3" type may include resources of a sub-type higher than the "3" sub-type in a similar way. Accordingly, two resource allocations included in each of the sub-type resources may be provided to two BSs communicating with each other.

As described above, "i" type resources (i=1, 2, 3, . . . ) include i pairs of resource allocations ("2×i" numbers). In order to avoid the problem of the loop interference when the BS managing server allocates resources for the communication between BSs to each of the BSs, the BS managing server should select only one allocation of the sub-types for each of the BSs.

For example, it is assumed that "1" type resources are used when one BS (BS 1) is connected to two BSs (BS2 and BS3). When BS1 uses the "A" resource allocation for the connection with BS2 and the "B" resource allocation for the connection with BS3, BS1 simultaneously transmits and receives a signal through one frequency band, and accordingly, the loop interference may be generated. Accordingly, the BS managing server allocates resources to support point-to-multipoint communication according to the distribution of neighboring BSs.

When a new BS is added, a process in which the BS managing server allocates the resources to each of the BSs is described below.

1) A case where there is no neighboring BS

When a new BS is installed in a state where there is no neighboring BS, the BS managing server allocates the "1" type resources to the new BS. At this time, the new BS may use one of the "A" resource allocation and the "B" resource allocation.

2) A case where there is at least one neighboring BS

When a new BS is added in a state where there is at least one neighboring BS, the BS managing server allocates the resources as follows.

(1) A case where resource allocations of existing BSs do not have to be changed for connections between the new BS and the existing neighboring BSs.

When the existing BSs use the "k" type resources and it is determined that the "k" type resources can be allocated to the new BS, the new BS may start point-to-multipoint communication with the existing BSs by using the "k" type resources. When the "k" type resources (k=2, 3, 4, . . . ) are allocated for a point-to-point connection between the BSs, the resources are allocated according to the following order. The BS managing server considers one of the neighboring BSs to be connected to the new BS as a reference BS. The BS managing server allocates odd numbered (first, third, . . . ) sub-type resources of the "k" type resources to a link between BSs connected in a radial direction based on the reference BS, and allocates even numbered (second, fourth, . . . ) sub-type resources of the "k" type resources to a link between BSs connected in a circulation direction based on the reference BS.

(2) A case where resource allocations of the existing BSs have to be changed for connections between the new BS and the existing neighboring BSs.

When the existing BSs use the "k" type resources and it is determined that the "k" type resources cannot be allocated to the new BS, the new BS and the neighboring BSs receive new resource allocation according to "k+1"

type resources. The BS managing server considers one of the neighboring BSs to be connected to the new BS as a reference BS. The BS managing server allocates odd numbered (first, third, . . . ) sub-type resources of the "k+1" type resources to a link between BSs connected in a radial direction based on the reference BS, and allocates even numbered (second, fourth, . . . ) sub-type resources of the "k+1" type resources to a link between BSs connected in a circulation direction based on the reference BS.

Further, a process in which, when one of the existing BSs is removed, the BS managing server reallocates resources the remaining BSs is described below. When there are no remaining neighboring BSs due to the removal of the BS, the BS managing server does not need to allocate the resources. However, when there is at least one remaining neighboring BS, the BS managing server allocates the resources as follows.

(1) A case where there is no need to change the existing resource allocation ("k" type resources")

The BS managing server removes only the resource allocation of the corresponding BS and informs neighboring BSs connected to the removed BS of only information on the removal of the BS.

(2) A case where there is a need to change the existing resource allocation ("k" type resources")

The BS managing server changes the resource allocation of at least one remaining BS to "k−1" type resources and allocates the resources according to the following order. The BS managing server considers one of the remaining neighboring BSs as a reference BS. The BS managing server allocates odd numbered (first, third, . . . ) sub-type resources of the "k−1" type resources to a link between BSs connected in a radial direction based on the reference BS and allocates even numbered (second, fourth, . . . ) sub-type resources of the "k−1" type resources to a link between BSs connected in a circulation direction based on the reference BS.

Figure 10A:
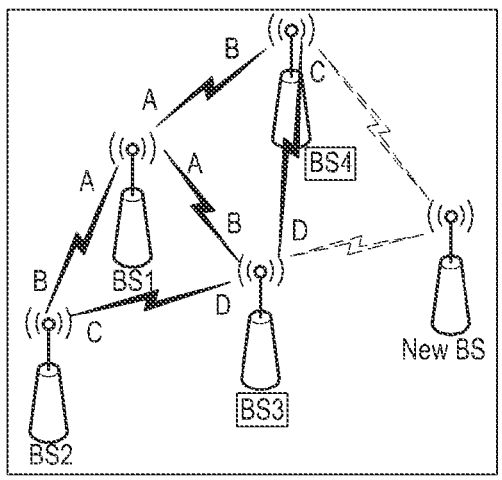
FIGS. 10A, 10B, and 10C illustrate an example of allocating resources for communication with neighboring BSs to a new BS according to an embodiment of the present disclosure.
Figure 10B:
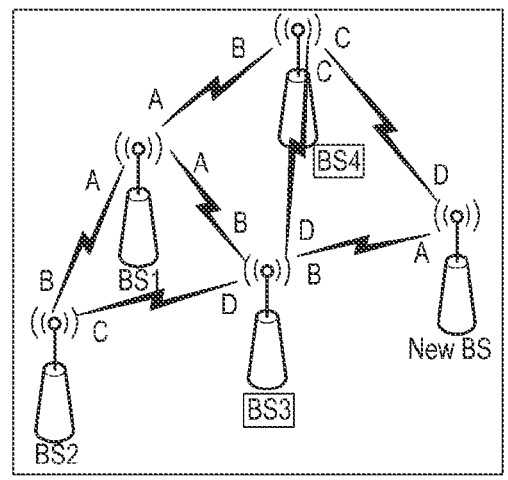
Figure 10C:
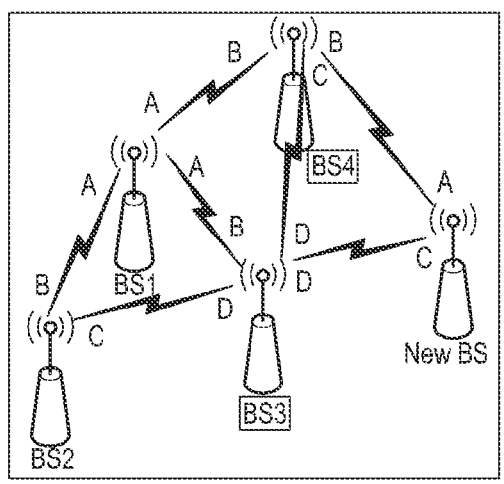

FIGS. 10A, 10B, and 10C illustrate an example of allocating resources for communication with neighboring BSs to a new BS according to an embodiment of the present disclosure.

Referring to FIG. 10A, existing BSs BS1, BS2, BS3, and BS4 have already received the "2" type resources and may communicate with each other by using the allocated resources. BS 1 uses the "A" resource allocation of the "2" type resources for communication with BS2, BS3, and BS4. Specifically, BS1 uses the frequency band f1 in a first time division interval to transmit signals to BS2, BS3, and BS4 and the frequency band f2 in the first time division interval to receive signals from BS2, BS3, and BS4. BS3 uses the "B" resource allocation for communication with BS1 and the "D" resource allocation for communication with BS4. That is, BS3 uses the frequency band f2 in the first time division interval to transmit a signal to BS1 and the frequency band f1 in the first time division interval to receive a signal from BS1. Further, BS3 uses the frequency band f1 in a second time division interval to transmit signals to BS2 and BS4, and the frequency band f2 in the second time division interval to receive signals from BS2 and BS4.

In a condition as illustrated in FIG. 10A, a new BS is installed in the vicinity of BS3 and BS4 and transmits BS report information to make a request for allocating resources to the BS managing server.

The BS managing server recognizes that the new BS can be connected to BS3 and BS 4 of the existing BSs based on the BS report information received from the new BS and pre-stored position information of the existing BSs. Then, the BS managing server allocates the resources to connect BS3 with the new BS and BS4 with the new BS according to the above described algorithm.

First, the BS managing server determines whether to change a type of resource allocation to connect the new BS with the neighboring BSs according to the following conditions based on the BS report information received from the new BS and pre-stored resource information of the neighboring BSs. That is, when the neighboring BS use the "k" type resources, whether to change the type of resource allocation is determined according to a number of resources configurations used for the communication between BSs. The resources configuration which each of the BSs can have refers to a combination including i resource allocations included in different sub-type resources when "i" type resources are used.

1) A case where a number of resource configurations used by the neighboring BSs to be connected to the new BS is equal to or smaller than 2k−1.

The new BS may receive the "k" type resources and resource allocations of the neighboring BSs are not changed.

2) A case where the number of resource configurations used by the neighboring BSs to be connected with the new BS is 2k.

The "k" type resources do not have enough sub-type resources to allocate resources to all the neighboring BSs and the new BS. Accordingly, the "k+1" type resources are newly introduced for the connection between BSs, and resource allocations of the new BS and the neighboring BSs are changed.

Referring to FIG. 10A, the BS managing server determines that the used "2" type resources can be directly used even though the new BS is added. Accordingly, resources as illustrated in FIG. 10B or 10C may be allocated to the new BS.

FIG. 10B illustrates a case where BS3 is selected as a reference BS. Since a connection between the new BS and BS3 is made in a radial direction from the reference BS corresponding to BS3, first sub-type resources "A and B" corresponding to the odd numbered sub-type resources of the "second" type resources may be allocated to the connection. Since BS3 already uses the "B" resource allocation, the "B" resource allocation is applied to BS3 and the "A" resource allocation is applied to the new BS corresponding to a counterpart. If the "A" resource allocation is applied to BS3 and the "B" resource allocation is applied to the new BS, the loop interference will be generated between the pre-used "B" resource allocation and the newly applied "A" resource allocation.

When the resource allocation between the new BS and BS3 is completed, the second sub-type resources "C and D" of the "2" type resources are allocated to a connection between the new BS and BS4 in a circulation direction from BS3 corresponding to the reference BS. At this time, since BS4 pre-uses the "C" resource allocation, the "C" resource allocation is applied to BS4 and the "D" resource allocation is applied to the new BS.

FIG. 10C illustrates a case where BS4 is selected as the reference BS. Since a connection between the new BS and BS4 is made in a radial direction from BS4 corresponding to the reference BS, the first sub-type resources "A and B" corresponding to the odd numbered sub-type resources of the "second" type resources may be allocated to the connection. Since BS4 already uses the "B" resource allocation, the "B" resource allocation is applied to BS4 and the "A" resource allocation is applied to the new BS corresponding to a counterpart. The second sub-type resources "C and D" of the "2"

type resources are allocated to the connection between the new BS and BS3 in the circulation direction from BS4 corresponding to the reference BS. Since BS3 pre-uses the "D" resource allocation, the "D" resource allocation is applied to BS3 and the "C" resource allocation is applied to the new BS.

Although it has been described that the BS managing server allocates the resources of the new BS and the neighboring BSs in FIGS. 10A to 10C, the new BS may determine resource allocation to be used for the connection with the neighboring BSs by itself when the resource allocation is not changed in another embodiment.

That is, the new BS directly receives resources information (and position information) from the neighboring BSs, or receives the resource information (and position information) from a system operator according to a predetermined signaling method, and determines whether the current resource allocation, that is, the "k" type resources, is available according to a number of resource configurations used by the neighboring BSs. When it is determined that the "k" type resources are available, that is, when the number of resource configurations used by the neighboring BSs is equal to or smaller than 2k−1, the new BS determines sub-type resources to be used for connections with the neighboring BSs according to the "k" type resources allocation method. In contrast, when the number of resource configurations used by the neighboring BSs is 2k, the new BS makes a request for allocating resources to the BS managing server or to another BS which can allocate resources, and the BS managing server or the other BS may allocate the resources to the new BS and the existing BSs in response to the request.

FIGS. 11A to 11E illustrate examples of changes in the resource allocation based on an installation of the BS according to an embodiment of the present disclosure.

Figure 11A:
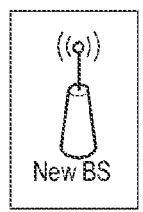
FIGS. 11A, 11B, 11C, 11D, and 11E illustrate examples of changes in the resource allocation based on an installation of the BS according to an embodiment of the present disclosure.

Referring to FIG. 11A, one new BS is installed in a state where there is no existing BS, and at this time resources for the communication between BSs are not required.

Figure 11B:
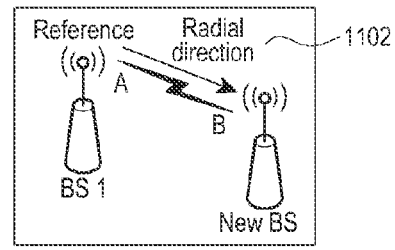

As illustrated in FIG. 11B, when the new BS is installed in a state where only one BS, corresponding to BS1, exists, BS1 becomes a reference BS and the "A" and "B" resource allocations of the "1" type resources are applied to BS1 and the new BS, respectively, in a connection between BS1 and the new BS.

Figure 11C:
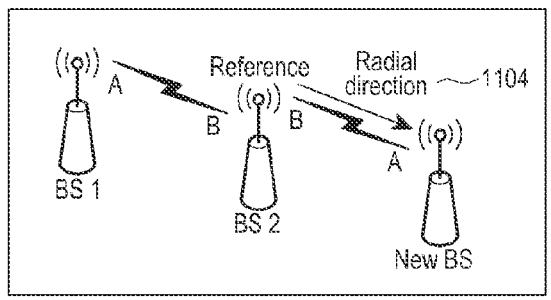

FIG. 11C illustrates that the new BS is installed in the vicinity of BS2 in a state where BS1 and BS2 having the resource allocations of FIG. 11B exist. The "1" type resources are currently used and a number of resource configurations used by BS2 to be connected to the new BS is one including "B" and thus 2k−1=1. Accordingly, the "1" type resources can be continuously used. The "B" and "A" resource allocations of the "1" type resources are allocated to BS2 and the new BS, respectively, in a connection between BS2 and the new BS made in a radial direction 1104 from BS2.

Figure 11D:
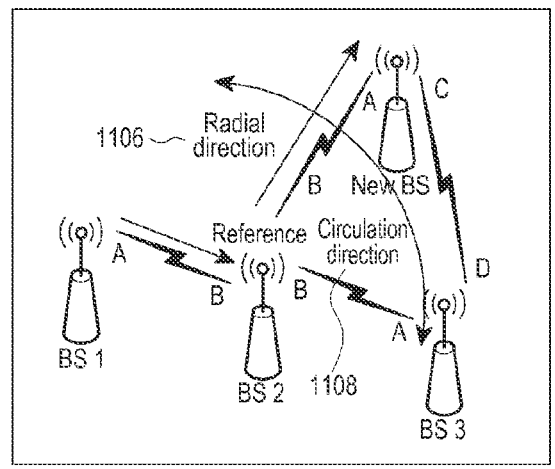

FIG. 11D illustrates that the new BS is installed in the vicinity of BS2 and BS3, but not BS1, in a state where BS1, BS2, and BS3 having the resource allocations of FIG. 11C exist. The "1" type resources are currently used and a number of resource configurations used by BS2 and BS3 connected to the new BS is two including "B" and "A" and thus 2k=2. Accordingly, the "1" type resources cannot be used anymore and the "2" type resources have to be applied to the communication between BSs. Then, resources of a connection between BS1 and BS2 are changed from the "A and B" sub-type resources of the "1" type to the "A and B" sub-type resources of the "2" type. Similarly, resources of a connection between BS2 and BS3 are changed from the "A and B" sub-type resources of the "1" type to the "A and B" sub-type resources of the "2" type.

Further, when BS2 is selected as the reference BS, the "A and B" sub-type resources corresponding to the odd numbered sub-type resources of the "2" type are allocated to the connection between BS2 and the new BS in a radial direction 1106 from BS2. Since BS2 currently uses the "B" resource allocation, the "B" resource allocation is applied to BS2 and the "A" resource allocation is applied to the new BS. The "C and D" sub-type resources corresponding to the even numbered sub-type resources of the "2" type are allocated to the connection between BS3 and the new BS in a circulation direction 1108 from BS2. Since BS3 does not currently use the "C and D" sub-type resources, the "C" resource allocation and the "D" resource allocation may be freely applied to BS3 and the new BS. In FIG. 11D, an example in which the "D" resource allocation is applied to BS3 and the "C" resource allocation is applied to the new BS is illustrated.

Figure 11E:
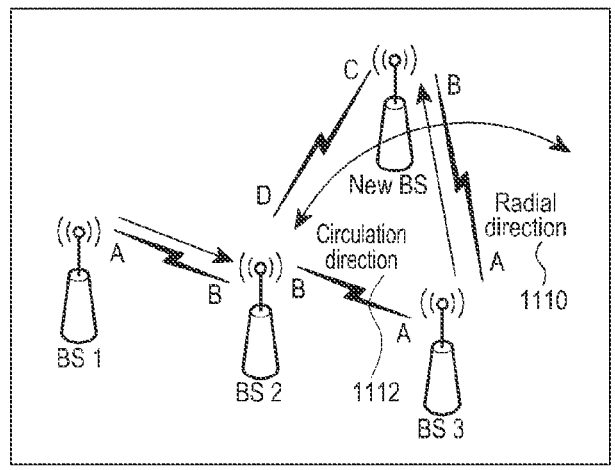

FIG. 11E illustrates that the new BS is installed in the vicinity of BS2 and BS3 in a state where BS1, BS2, and BS3 having the resource allocations of FIG. 11C exist and BS3 is selected as the reference BS. The "A and B" sub-type resources corresponding to the even numbered sub-type resources of the "2" type are allocated to the connection between BS3 and the new BS in a radial direction 1110 from BS3. Since BS3 currently uses the "A" resource allocation, the "A" resource allocation is applied to BS3 and the "A" resource allocation is applied to the new BS. The "C and D" sub-type resources corresponding to the even numbered sub-type resources of the "2" type are allocated to the connection between BS2 and the new BS in a circulation direction 1112 from BS3. Since BS2 does not conventionally use the "C and D" sub-type resources, the "C" resource allocation and the "D" resource allocation may be freely applied to BS3 and the new BS. In FIG. 11E, an example in which the "D" resource allocation is applied to BS2 and the "C" resource allocation is applied to the new BS is illustrated.

FIGS. 12A to 12E illustrate an example of an operation of determining whether a resource allocation scheme is changed by the new BS when resources are allocated according to an embodiment of the present disclosure.

Figure 12A:
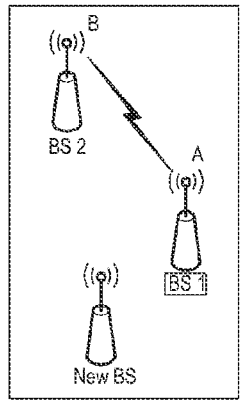
FIGS. 12A, 12B, 12C, 12D, and 12E illustrate an example of an operation of determining whether a resource allocation scheme is changed by a new BS when resources are allocated according to an embodiment of the present disclosure.
Figure 12B:
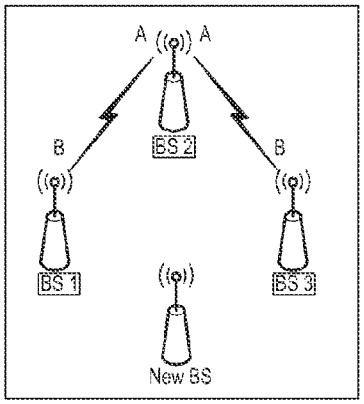

FIGS. 12A and 12B illustrates an example of using the "1" type resources in which a resource allocation scheme is changed when a number of resource configurations used by the neighboring BSs corresponds to 2k=2.

FIG. 12A illustrates a case in which the new BS is installed in the vicinity of BS1 in a state where BS1 and BS2 exist. The "1" type resources are currently used, a neighboring BS which can be connected to the new BS is BS 1, and a resource configuration used by BS1 is "A" and thus a number of resource configurations is 1. Accordingly, the resource allocation scheme does not have to be changed.

Referring to FIG. 12B, the new BS is installed in a state where BS1, BS2, and BS3 exist and neighboring BSs which can be connected to the new BS are BS1, BS2, and BS3. Resource configurations used by the neighboring BSs is "A" (BS2) and "B" (BS1 and BS3) and thus a number of resource configurations is 2. That is, the same resource configuration used by different BSs is not overlappingly counted. Accordingly, the resource allocation scheme should be changed to the "2" type resources.

Figure 12C:
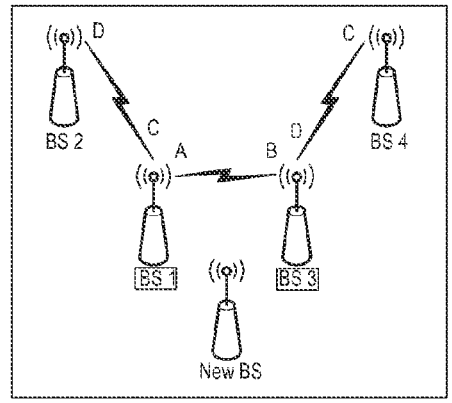
Figure 12D:
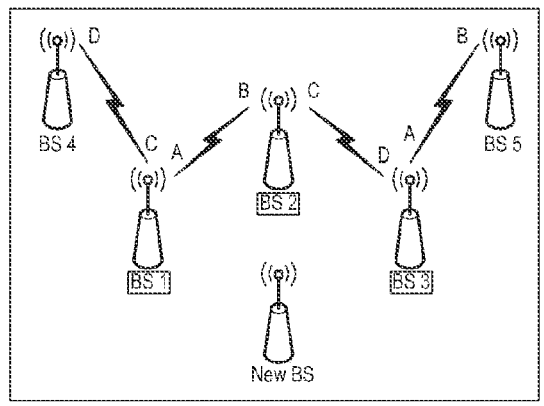
Figure 12E:
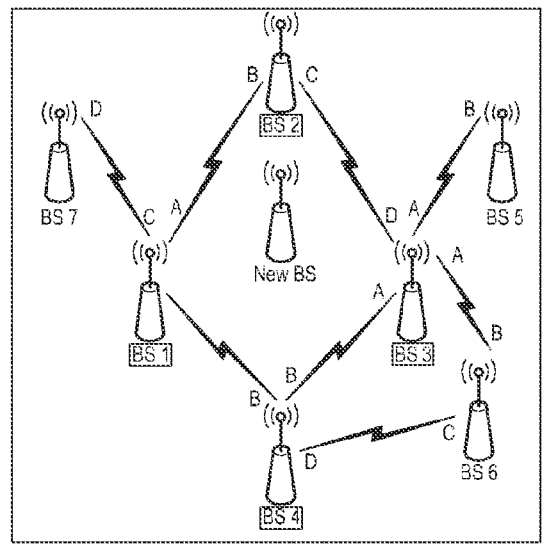

FIGS. 12C, 12D, and 12E illustrate a case where the "2" type resources are used. When the "2" type resources are used, the resource configuration which each BS can have is expressed by a combination including two resource allocations included in different sub-type resources. The resource allocation scheme is changed when a number of resource configurations used by the neighboring BSs corresponds to 2k=4.

Referring to FIG. 12C, neighboring BSs which can be connected to the new BS are BS1 and BS3, and resource configurations used by the neighboring BSs are "AC (BS1)" and "BD (BS3)" and thus a number of resource configurations is 2. Accordingly, the resource allocation scheme does not have to be changed.

Referring to FIG. 12D, neighboring BSs which can be connected to the new BS are BS1, BS2, and BS3, and resource configurations used by the neighboring BSs are "AC (BS1)", "BC (BS2)", and "AD (BS3)" and thus a number of resource configurations is 3. Accordingly, the resource allocation scheme is not changed.

Referring to FIG. 12E, neighboring BSs which can be connected to the new BS are BS1, BS2, BS3, and BS4, and resource configurations used by the neighboring BSs are "AC (BS 1)", "BC (BS2)", "AD (BS3)" and "BD (BS4)" and thus a number of resource configurations is 4. Accordingly, the resource allocation scheme is changed to the "3" type resources.

Similarly, when the "k" type resources are used, the resource configuration used by each BS is expressed by a combination including k resource allocations included in each of different sub-type resources, and the resource allocation scheme is changed when a number of resource configurations used by the neighboring BSs is 2k.

When at least one BS is removed in a state where a plurality of BSs exist, the BS managing server may receive BS removal information from the removed BS before the removal or receive the BS removal information from an operator and change resource allocations of the remaining BSs if necessary. When the BS is removed, the change of the resource allocation scheme is determined by the following conditions. That is, when neighboring BSs of the new BS use the "k" type resources, whether to change the resource allocation scheme is determined as follows.

1) A case where the remaining BSs except for the removed BS use k−i (i=1, 2, ... k−1) sub-type resources.
   Resource allocations of the neighboring BSs may be changed to the "k−1" type resources.
2) A case where the remaining BSs except for the removed BS use k sub-type resources.
   Resource allocations of the neighboring BSs may be maintained as the "k" type resources.

Figure 13:
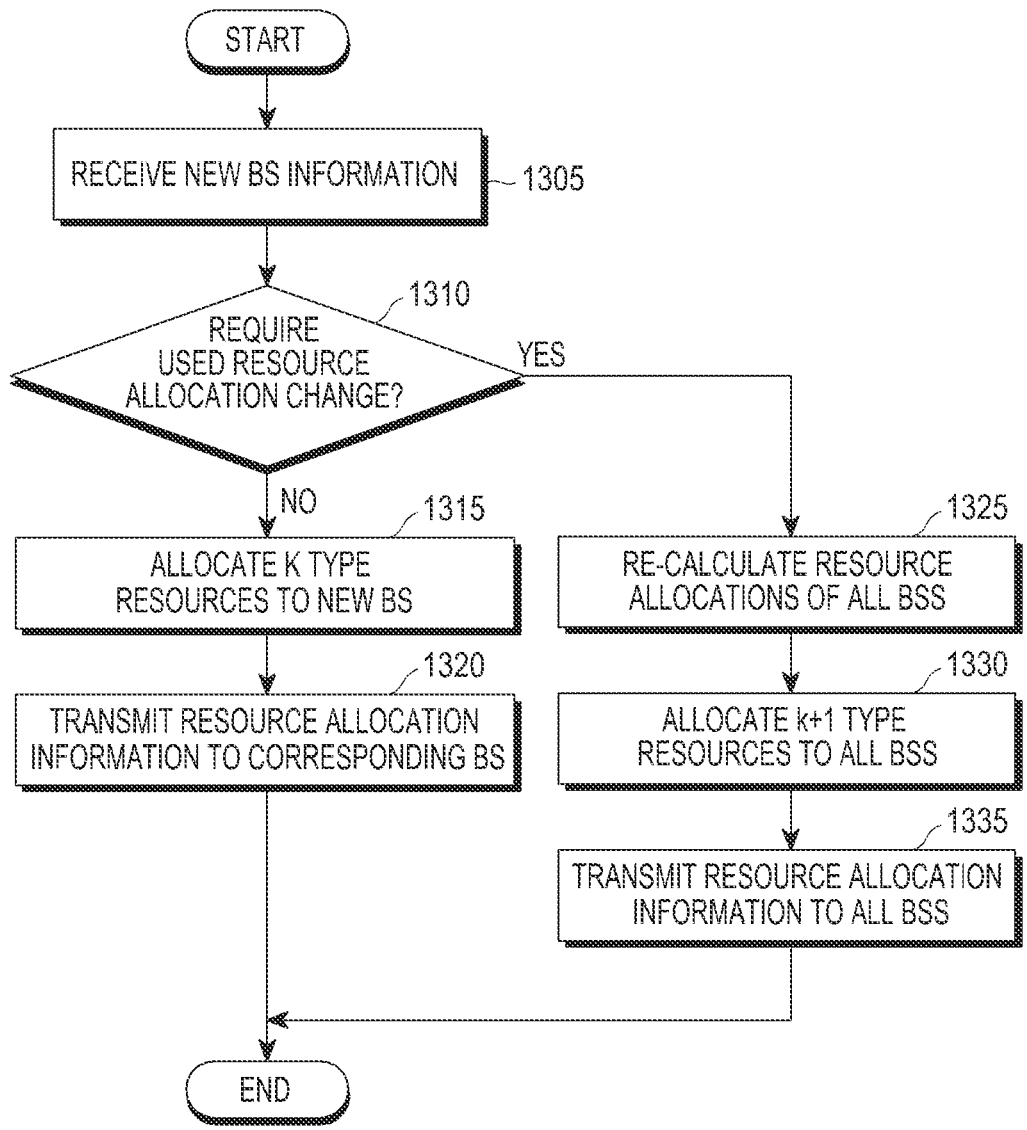
FIG. 13 is a flowchart illustrating a resource allocating process for communication between BSs when a BS is added according to an embodiment of the present disclosure.

FIG. 13 is a flowchart illustrating a resource allocating process for the communication between BSs when the BS is added according to an embodiment of the present disclosure.

Referring to FIG. 13, the BS managing server receives BS report information of a new BS from the new BS, or detects that the new BS is added by receiving the BS report information of the new BS from an operator, in operation 1305. The BS report information includes RF chain information and position information of the new BS, for example, information configured as shown in FIG. 6. In operation 1310, the BS managing server determines whether there is a need to change the used resource allocation scheme based on the position information of the new BS and position/resource information of the currently existing BSs. For example, the determination may be made based on the "k" type resource allocation which is currently used and a number of resource configurations used by neighboring BSs to be connected to the new BS.

When there is no need to change the currently used resource allocation scheme, for example, when a number of resource configurations used by the neighboring BSs to be connected to the new BS is equal to or smaller than 2k−1, operation 1315 is performed. In operation 1315, the BS managing server applies at least one of the resource allocations of the "k" type resources to the new BS. Specifically, sub-type resources are allocated to each link between the new BS and each neighboring BS. In operation 1320, resource allocation information indicating resources allocated to the new BS is transmitted to the new BS and each of the neighboring BSs connected to the new BS. The resource allocation information indicates RF chains for each link of each BS and resource allocation, for example, information configured as shown in FIG. 7.

When there is the need to change the currently used resource allocation scheme, for example, when a number of resource configurations used by the neighboring BSs to be connected to the new BS is 2k, operation 1325 is performed. The BS managing server determines again resource allocations for links between all BSs including the new BS in operation 1325 and applies resource allocations of the "k+1" type resources to all the links in operation 1330. In operation 1335, resource allocation information indicating the resource allocations applied to all the BSs including the new BS are transmitted to all the BSs.

In an embodiment, the new BS directly receives resources information (and position information) from the neighboring BSs or receives the resource information (and position information) from a system operator according to a predetermined signaling method, and determines whether the current resource allocation, that is, the "k" type resources, is available according to a number of resource configurations used by the neighboring BSs. When it is determined that the "k" type resources are available, that is, when the number of resource configurations used by the neighboring BSs is equal to or smaller than 2k−1, the new BS determines sub-type resources to be used for connections with the neighboring BSs according to the "k" type resources allocation method.

In contrast, when the number of resource configurations used by the neighboring BSs is 2k, the new BS makes a request for allocating resources to the BS managing server or another BS which can allocate resources. The BS managing server or other BS allocates resources to the new BS and the existing BSs according to the "k+1" type resource allocation scheme in response to the request.

Figure 14:
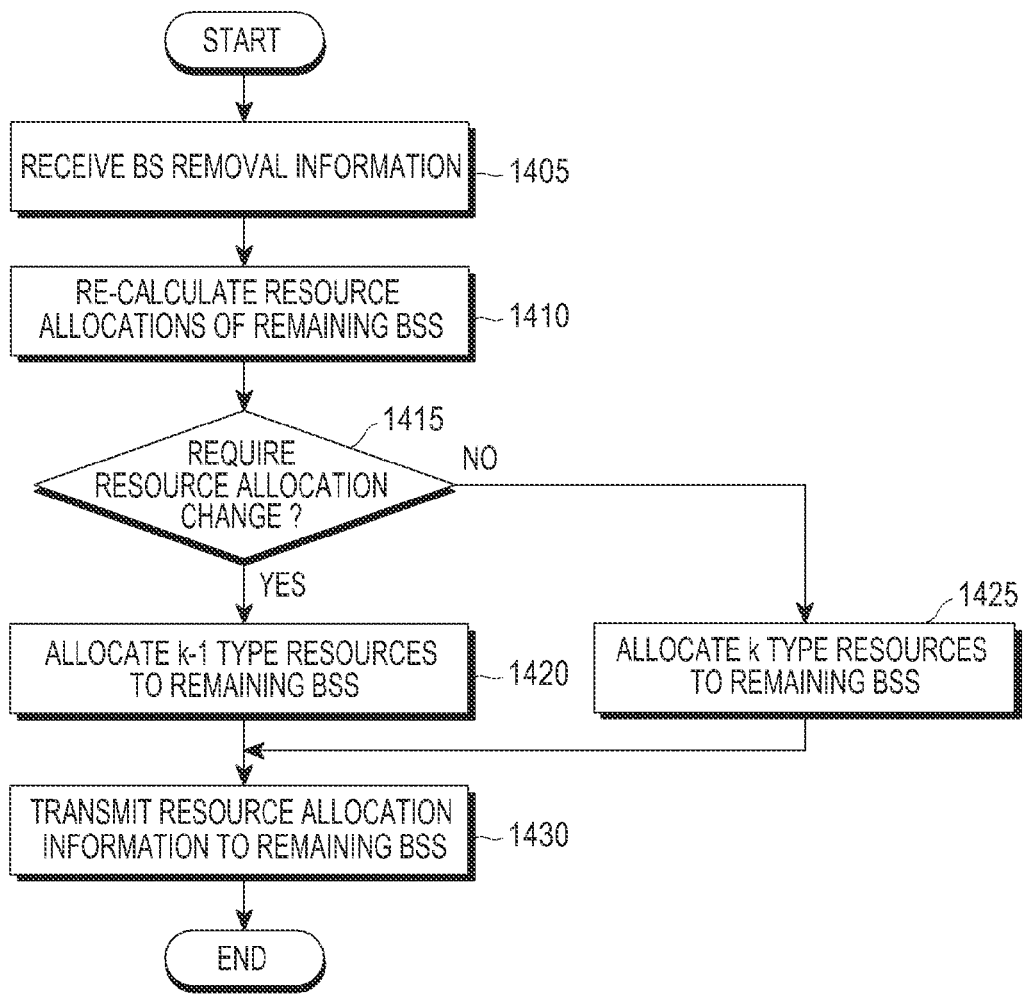
FIG. 14 is a flowchart illustrating a resource allocating process for communication between BSs when a BS is removed according to an embodiment of the present disclosure.

FIG. 14 is a flowchart illustrating a resource allocating process for the communication between BSs when the BS is removed according to an embodiment of the present disclosure.

Referring to FIG. 14, the BS managing server receives BS removal information of a BS to be removed, from the BS to be removed, or receives the BS removal information of the BS to be removed from an operator, so as to detect the removal of at least one BS in operation 1405. The BS managing server detects a resource allocation state of the remaining BSs except for a BS to be removed in operation 1410 and determines whether there is a need to change the used resource allocation scheme based on the detected state information in operation 1415. For example, the determination may be made based on the "k" type resource allocation scheme which is currently used and a number of sub-type resources used by the remaining BSs.

For example, when there is the need to change the conventionally used resource allocation scheme, if a number of sub-type resources used by the remaining BSs is k−i (i= 1, 2, ... , or k−1), operation 1420 is performed. In operation 1420, the BS managing server applies resource allocations of the "k−1" type resources to the remaining BSs. In contrast, for example, when there is no need to change the conventionally used resource allocation scheme, if a number of sub-type resources used by the remaining BSs is k, operation 1425 is performed. In operation 1425, when the "k" type resources allocated to the remaining BSs are not changed or there is the need to change the "k" type resources, the BS managing server re-applies the resource allocations of the "k" type resources.

In operation 1430, resource allocation information indicating new resource allocation is transmitted to the remaining BSs.

Figure 15:
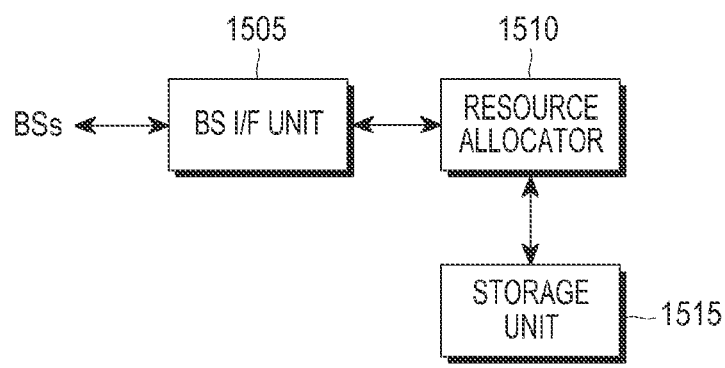
FIG. 15 is a block diagram illustrating a simplified configuration of a device which allocates communication resources between BSs according to an embodiment of the present disclosure.

FIG. 15 is a block diagram illustrating a simplified configuration of a device which allocates communication resources between BSs according to an embodiment of the present disclosure. The device illustrated as an example may be the BS managing server.

Referring to FIG. 15, the BS managing server includes a BS InterFace (I/F) unit 1505, a resource allocation unit 1510, and a storage unit 1515. The BS I/F unit 1505 is connected to a plurality of BSs by using an IP network or another connection means, receives a resource allocation request including BS information from a newly installed BS or a BS to be removed, and/or receives the resource allocation request including the information of the newly installed BS or the BS to be removed from a system operator. The resource allocation unit 1510 determines a resource allocation scheme for the communication between BSs according to the aforementioned algorithm in response to the resource allocation request and determines resource allocations of links between BSs according to the determined method. Resource/position information of the existing BSs pre-stored in the storage unit 1515 is used for determining the resource allocation scheme and the resource allocations. Information on the determined resource allocation may be transmitted to the corresponding BS through the BS I/F unit 1505 and stored in the storage unit 1515 at the same time.

Hereinafter, an embodiment of allocating resources to a new BS and neighboring BSs without the BS managing server will be described.

Figure 16A:
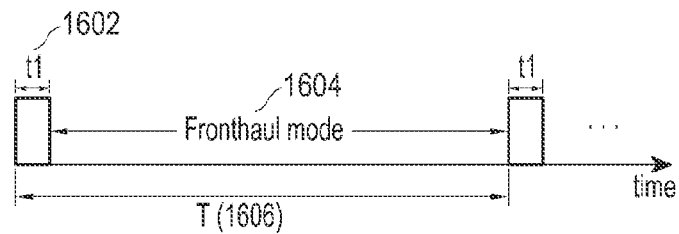
FIG. 16A illustrates timing of a resource allocating operation of a new BS according to an embodiment of the present disclosure.

FIG. 16A illustrates timing of a resource allocating operation of the new BS according to an embodiment of the present disclosure.

Referring to FIG. 16A, each BS operates in a neighbor detection phase 1602 for detecting neighboring BSs according to a predetermined period T 1606. The neighbor detection phase 1602 lasts for a time t1, and each BS detects the existence of the neighboring BSs and an installation of the new BS for the time t1. Similarly, the new BS detects the existing neighboring BSs for the time t1 allocated to the neighbor detection phase 1602. For the remaining time 1604 except for the time t1 1602 in the period T 1606, each BS may communicate with other BSs in a front-haul mode.

Figure 16B:
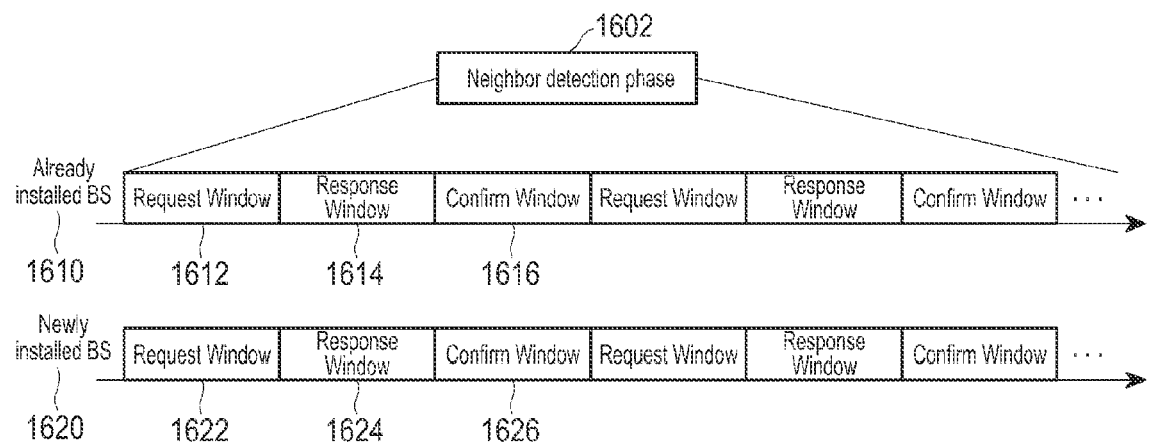
FIG. 16B illustrates detailed timing of a neighbor detection phase for allocating resources to a new BS and neighboring BSs according to another embodiment of the present disclosure.

FIG. 16B illustrates detailed timing of the neighbor detection phase for allocating resources to the new BS and the neighboring BSs according to another embodiment of the present disclosure.

Referring to FIG. 16B, resources of the neighbor detection phase 1602 include three windows 1612, 1614, and 1616 or 1622, 1624, and 1626 having a predetermined length, and the three windows 1612, 1614, and 1616 or 1622, 1624, and 1626 may be repeated at least once for the neighbor detection phase 1602. Operations of the three windows 1612, 1614, and 1616 or 1622, 1624, and 1626 are described below. A new BS 1620 transmits a Neighbor Discovery Request (NDR) including information of the BS 1620 to at least one existing neighboring BS 1610 for the request window 1612 or 1622. The existing BS 1610 monitors whether the NDR message transmitted from the new BS 1620 exists for the request window 1612 or 1622. For example, the NDR message may have a format as illustrated in FIG. 6.

The new BS 1620 uses random backoff to avoid conflict with transmission by another new BS when transmitting the NDR message for the request window 1612 or 1622. That is, the NDR message may be transmitted at a time when an offset corresponding to a randomly configured backoff value exists within the request window 1612 or 1622.

The existing BS 1610, having detected the NDR message transmitted from the new BS 1620, transmits a Neighbor Discovery reSponse (NDS) message in response to the NDR message of the new BS 1620 for the response window 1614 or 1624. The new BS 1620 having transmitted the NDR message for the request window 1612 or 1622 monitors whether the NDS message transmitted from at least one existing BS 1610 exists for the response window 1614 or 1624. For example, the NDS message may have a format as illustrated in FIG. 7 and indicates resources allocated to one BS transmitting the NDS message.

The existing BS 1610 uses random backoff to avoid conflict with transmission by another existing BS. That is, the NDS message may be transmitted at a time when an offset corresponds to a randomly configured backoff value within the response window 1614 or 1624.

The new BS 1620 having received the NDS message determines resource allocation to be used for communication with the existing BS 1610 having transmitted the NDS message based on information received through the NDS message. The new BS 1620 transmits the information on the determined resource allocation between the two BSs 1610 and 1620 to a neighboring BS having transmitted the NDS message for a confirm window 1616 or 1626 through a Neighbor Discovery Confirm (NDC) message. For example, the NDC message may have a format as illustrated in FIG. 7 and includes information on resource allocation of the new BS 1620.

The new BS detecting the existing neighboring BSs through the operation of the neighbor detection phase 1602 determines resources for the communication therebetween through an operation described below.

A process of allocating resources to a communication link between the new BS and each of the neighboring BSs is performed as follows in consideration of a resource allocation set of each of the BSs. The resource allocation set refers to a set of resource allocations used by each of the BSs for the communication between BSs.

1) When an intersection between a resource allocation set of the neighboring BS transmitting the NDS and a resource allocation set of the new BS is empty and the resource allocation set of the new BS is empty, one resource allocation is selected from the resource allocation set of the neighboring BS transmitting the NDS.

2) When the intersection between the resource allocation set of the neighboring BS transmitting the NDS and the resource allocation set of the new BS is empty and the resource allocation set of the new BS exists, one resource allocation is selected from the resource allocation set of the new BS.

3) When the intersection between the resource allocation set of the neighboring BS transmitting the NDS and the resource allocation set of the new BS is not empty (that is, when a number of resource allocations included in the intersection is larger than 0) and a number of elements included in the intersection (that is, resources allocations) is smaller than "k", the resource allocation is determined as follows. The "k" refers to a type of the resource allocation used by the existing BSs.

3-1) When one or more resource allocations which are not included in the intersection exist, one of the resource allocations which are not included in the intersection is used to connect the new BS with the neighboring BS.

3-2) When resource allocation which is not included in the intersection does not exist, resource allocation of a sub-type different from the resource allocation of the intersection. In other words, when one of the resource allocations of the intersection is the "i" sub-type resource, one resource allocation of "m" sub-type resources is selected to be used for the connection between the new BS and the neighboring BS. (∀m, m≠i)

3-3) When a number of elements of the intersection is "k", resource allocations of the new BS and the neighboring BSs are changed to the "k+1" type.

Figure 17A:
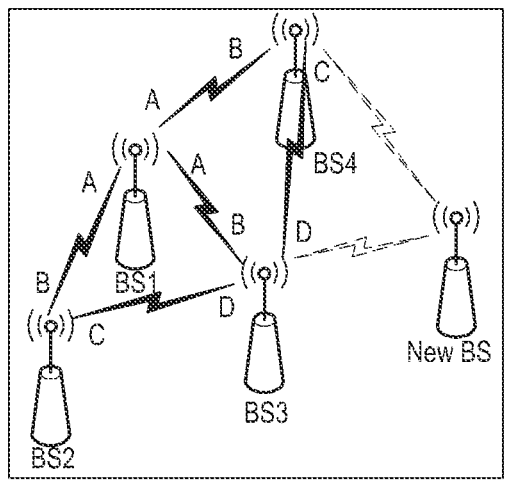
FIGS. 17A, 17B, and 17C illustrate an example in which a new BS allocates resources for communication with neighboring BSs according to another embodiment of the present disclosure.
Figure 17B:
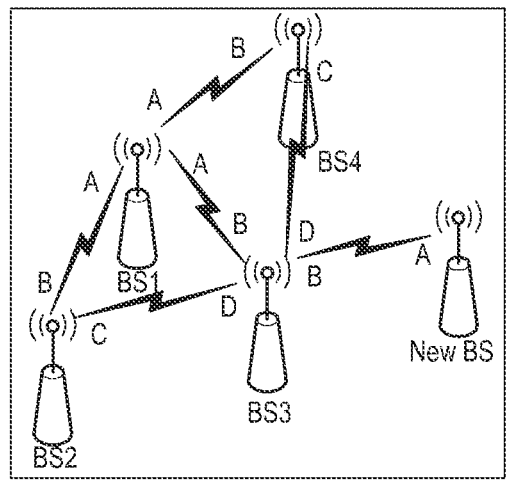
Figure 17C:
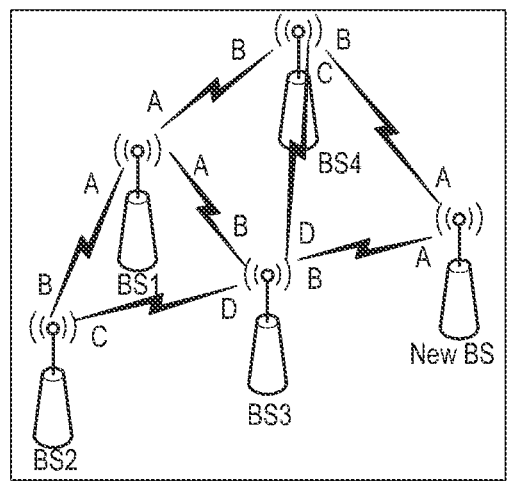

FIGS. 17A, 17B, and 17C illustrate an example in which a new BS allocates resources for communication with neighboring BSs according to another embodiment of the present disclosure. FIGS. 17A, 17B, and 17C illustrate an example of allocating resources for communication between the new BS and the neighboring BSs when an intersection between a resource allocation set of the neighboring BS transmitting the NDS and a resource allocation set of the new BS is empty in an environment where there is no BS managing server.

Referring to FIG. 17A, existing BSs BS1, BS2, BS3, and BS4 are connected to each other by using the "2" type resources and may communicate with each other by using the allocated resources. BS 1 uses the "A" resource allocation of the "2" type resources for communication with BS2, BS3, and BS4. Specifically, BS1 uses the frequency band f1 in a first time division interval to transmit signals to BS2, BS3, and BS4 and the frequency band f2 in the first time division interval to receive signals from BS2, BS3, and BS4. BS3 uses the "B" resource allocation for communication with BS1 and the "D" resource allocation for communication with BS2 and BS4. That is, BS3 uses the frequency band f2 in the first time division interval to transmit a signal to BS 1 and the frequency band f1 in the first time division interval to receive a signal from BS1. Further, BS3 uses the frequency band f1 in a second time division interval to transmit signals to BS2 and BS4 and the frequency band f2 in the second time division interval to receive signals from BS2 and BS4.

In a condition of FIG. 17A, the new BS is installed in the vicinity of BS3 and BS4 and neighboring BSs transmit the NDR when the new BS transmits the NDS for the request window of the neighbor detection phase for the connection with the neighboring BSs. In FIG. 17A, a case where the NDS transmitted by BS3 first arrives at the new BS is illustrated.

The NDS transmitted by BS3 indicates the "B and D" resource allocations used by BS3. That is, the resource allocation set of BS3 includes "B and D". The new BS has a resource allocation set of Φ since the new BS does not have resource allocation yet. That is, an intersection between the resource allocation set of BS3 and the resource allocation set of the new BS is a null set. In this case, one of the "B and D" resource allocations which are included in the resource allocation set of BS3 is selected for the connection between the new BS and BS3. In FIG. 17B, the "B" resource allocation is selected, and accordingly, the new BS determines to be connected with BS3 by using the "A and B" sub-type resources. Then, the new BS transmits the NDC including the determined "A and B" sub-type resources or information on the "A" resource allocation to BS3 for the continuous response window.

The new BS transmits the NDR again in a next request window of the neighbor detection phase and BS4 transmits the NDS. Since the NDS transmitted by BS4 indicates the "B and C" resource allocation used by BS4 and the new BS uses the "A" resource allocation, an intersection between a resource allocation set of BS4 and the resource allocation set of the new BS is a null set. In this case, one resource configuration of the resource allocation set of the new BS is selected for the connection between BS4 and the new BS. The resource allocation set of the new BS includes only "A", so that the "A" resource allocation is selected for the connection between BS4 and the new BS as illustrated in FIG. 17C. The new BS transmits the NDC including information indicating the "A" resource allocation to BS4 for the continuous response window.

Figure 18A:
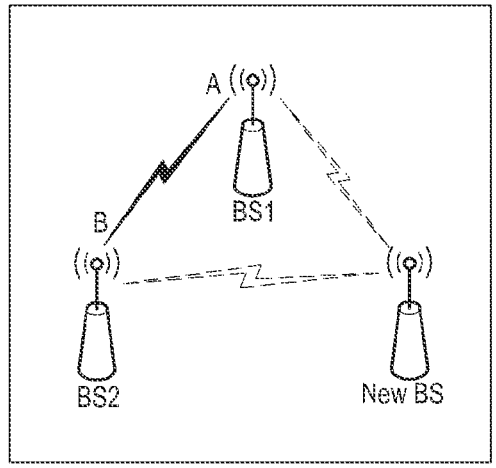
FIGS. 18A, 18B, and 18C illustrate another example in which a new BS allocates resources for communication with neighboring BSs according to another embodiment of the present disclosure.
Figure 18B:
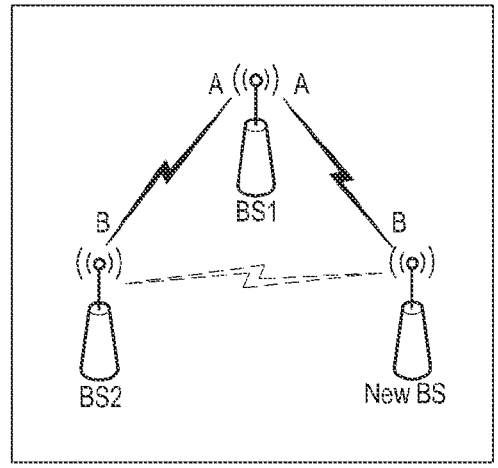
Figure 18C:
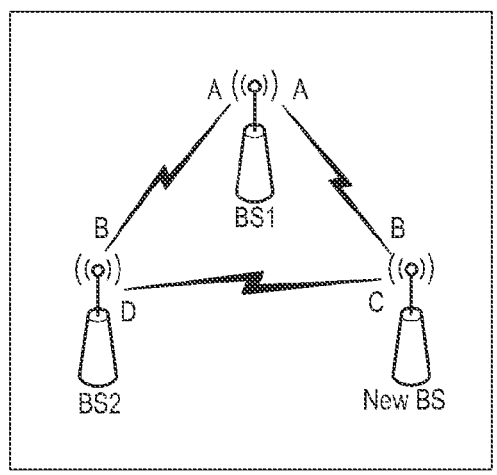

FIGS. 18A, 18B, and 18C illustrate another example in which a new BS allocates resources for communication with neighboring BSs according to another embodiment of the present disclosure. FIGS. 18A, 18B, and 18C illustrate an example of allocating resources for communication between the new BS and the neighboring BSs when an intersection between a resource allocation set of the neighboring BS transmitting the NDS and a resource allocation set of the new BS is not empty in an environment where there is no BS managing server.

Referring to FIG. 18A, existing BSs BS1 and BS2 are already connected to each other by using the "2" type resources (k=2) and may communicate with each other by using the allocated resources. BS1 uses the "A" resource allocation of the "2" type resources to communicate with BS2, and accordingly, BS2 uses the "B" resource allocation to communication with BS 1. Specifically, BS 1 uses the frequency band f1 in a first time division interval to transmit a signal to BS2 and the frequency band f2 in the first time division interval to receive a signal from BS2.

In a condition of FIG. 18A, the new BS is installed in the vicinity of BS1 and BS2 and transmits the NDR for the request window of the neighbor detection phase for connections with the neighboring BSs. Then, the neighboring BSs transmit the NDS. In FIG. 18A, a case where the NDS transmitted by BS1 first arrives at the new BS is illustrated.

The NDS transmitted by BS1 indicates the "A" resource allocation used by BS1. That is, the resource allocation set of BS1 includes "A". The new BS has a resource allocation set of Φ since the new BS does not have resource allocation yet. That is, an intersection between the resource allocation set of BS 1 and the resource allocation set of the new BS is a null set. In this case, one of the resource allocations which are included in the resource allocation set of BS1 is selected for the connection between the new BS and BS1. In FIG. 18B, the "A" resource allocation is selected, and accordingly, the new BS determines to be connected with BS 1 by using the "A and B" sub-type resources. Then, the new BS transmits the NDC including the determined "A and B" sub-type resources or information on the "B" resource allocation to BS 1 for the continuous response window.

The new BS transmits the NDR again in a next request window of the neighbor detection phase and BS2 transmits the NDS. The NDS transmitted by BS2 indicates the "B" resource allocation used by BS2 and the new BS uses the "B" resource allocation. The intersection between the resource allocation set of BS2 and the resource allocation set of the new BS is not a null set and an element included in the intersection is the "B" resource allocation and thus a number of elements is one. That is, a number of elements of the intersection is smaller than k (k=2). Further, there is no resource allocation which is not included in the intersection. In this case, sub-type resources different from the first sub-type resources related to the "B" resource allocation corresponding to the element of the intersection are selected for the connection between the new BS and BS2. Accordingly, as illustrated in FIG. 18C, the "C and D" sub-type resources corresponding to the second sub-type resources are selected, and the new BS uses the "C" resource allocation and BS2 uses the "D" resource allocation. Then, the new BS transmits the NDC including the determined "C and D" sub-type resources or information on the "C" resource allocation to BS2 for the continuous response window.

Figure 19A:
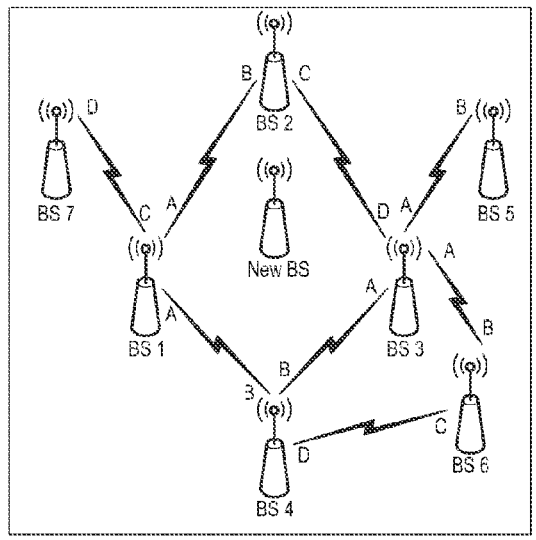
FIGS. 19A, 19B, 19C, and 19D illustrate another example in which a new BS allocates resources for point-to-multipoint communication with neighboring BSs according to another embodiment of the present disclosure.
Figure 19B:
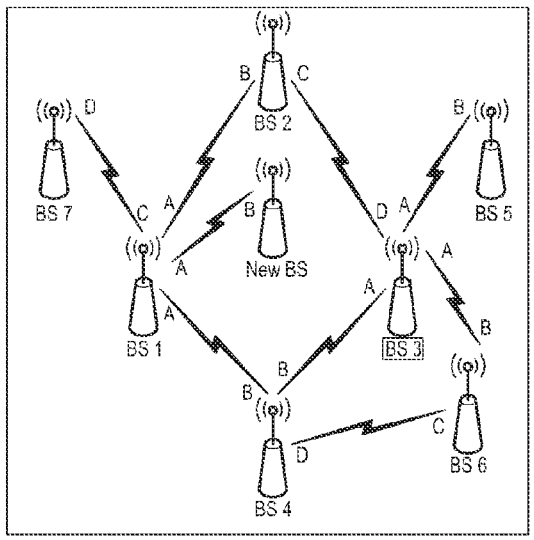
Figure 19C:
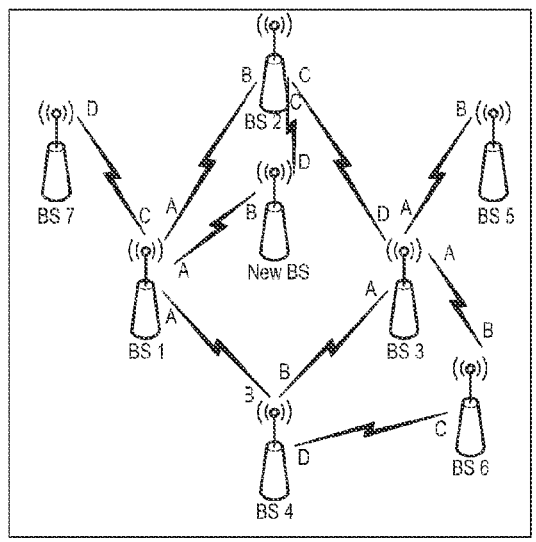

FIGS. 19A to 19D illustrate another example in which the new BS allocates resources for point-to-multipoint communication with neighboring BSs according to another embodiment of the present disclosure. FIGS. 19A, 19B, and 19C illustrate an example of allocating resources for communication between the new BS and the neighboring BSs when an intersection between a resource allocation set of the neighboring BS transmitting the NDS and a resource allocation set of the new BS is not empty in an environment where there is no BS managing server.

Referring to FIG. 19A, existing BSs BS1, BS2, BS3, BS4, BS5, BS6, and BS7 are connected to each other by using the "2" type resources and may communicate with each other by using the allocated resources. BS 1 uses the "A" type resource allocation of the "2" type resource to communication with BS2 and BS4 and uses the "C" resource allocation of the "2" type resource to communication with BS7. Specifically, BS1 uses the frequency band f1 in a first time division interval to transmit signals to BS2 and BS4 and the frequency band f2 in the first time division interval to receive signals from BS2 and BS4. Further, BS1 uses the frequency band f2 in a second time division interval to transmit a signal to BS7 and the frequency band f1 in the second time division interval to receive a signal from BS7.

BS3 uses the "A" resource allocation for communication with BS4, BS5, and BS6 and the "D" resource allocation for communication with BS2. That is, BS3 uses the frequency band f1 in the first time division interval to transmit signals to BS4, BS5, and BS6 and the frequency band f2 in the first time division interval to receive signals from BS4, BS5 and BS6. Further, BS3 uses the frequency band f1 in the second time division interval to transmit a signal to BS2 and the frequency band f2 in the second time division interval to receive a signal from BS2.

In a condition of FIG. 19A, the new BS is installed in the vicinity of BS1, BS2, BS3, and BS4 and neighboring BSs transmit the NDS when the new BS transmits the NDR for the request window of the neighbor detection phase for the connection with the neighboring BSs. In FIG. 19B, a case where the NDS transmitted by BS1 first arrives at the new BS is illustrated.

The NDS transmitted by BS1 indicates the "A and C" resource allocations used by BS1. That is, the resource allocation set of BS1 includes "A and C". The new BS has a resource allocation set of Φ since the new BS does not have resource allocation yet. That is, an intersection between the resource allocation set of BS1 and the resource allocation set of the new BS is a null set. In this case, one of the "A and C" resource allocations which are included in the resource allocation set of BS1 is selected for the connection between the new BS and BS1. In FIG. 19B, the "A" resource allocation is selected, and accordingly, the new BS determines to be connected with BS1 by using the "A and B" sub-type resources. Then, the new BS transmits the NDC including the determined "A and B" sub-type resources or information on the "B" resource allocation to BS1 for the continuous response window. The new BS transmits the NDR again in a next request window of the neighbor detection phase and BS2 transmits the NDS. The NDS transmitted by BS2 indicates the "B and C" resource allocations used by BS2 and the new BS uses the "B" resource allocation, so that the intersection between the resource allocation set of BS2 and the resource allocation set of the new BS is not a null set and an element included in the intersection is the "B" resource allocation and thus a number of elements is one. That is, a number of elements of the intersection is smaller than k (k=2). Further, the "C" resource allocation which is not included in the intersection exists. In this case, as illustrated in FIG. 19C, the "C" resource allocation which is not included in the intersection is selected for the connection between the new BS and BS2. Accordingly, the new BS determines to be connected with BS2 by using the "D" resource allocation. Then, the new BS transmits the NDC including the determined "C and D" sub-type resources or information on the "D" resource allocation to BS2 for the continuous response window.

Figure 19D:
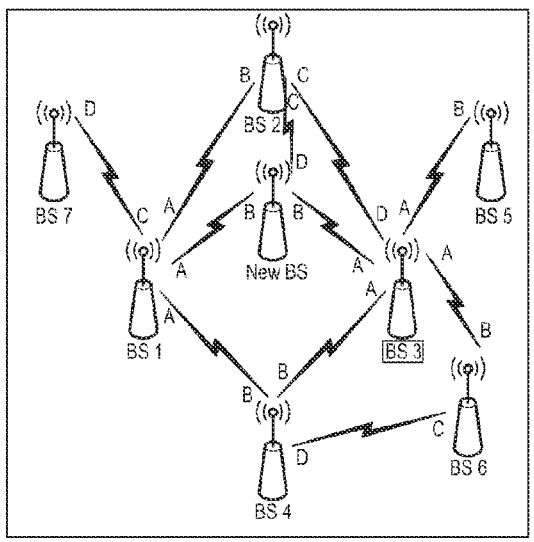

The new BS transmits the NDR again in a next request window of the neighbor detection phase or a request window of a next neighbor detection phase and BS3 transmits the NDS. The NDS transmitted by BS3 indicates the "A and D" resource allocations used by BS3 and the new BS uses the "B and D" resource allocations, so that the intersection between the resource allocation set of BS3 and the resource allocation set of the new BS is not a null set and an element included in the intersection is the "D" resource allocation and thus a number of elements is one. That is, a number of elements of the intersection is smaller than k (k=2). Further, the "A and B" resource allocations which are not included in the intersection exist. In this case, as illustrated in FIG. 19D, the "A" resource allocation which is not included in the intersection is selected for the connection between the new BS and BS3. Accordingly, the new BS determines to be connected with BS3 by using the "B" resource allocation. Then, the new BS transmits the NDC including information on the determined "B" resource allocation to BS3 for the continuous response window.

The new BS transmits the NDR again in a next request window of the neighbor detection phase or a request window of a next neighbor detection phase and BS4 transmits the NDS. The NDS transmitted by BS4 indicates the "B and D" resource allocations used by BS4 and the new BS uses the "B and D" resource allocations. The intersection between the resource allocation set of BS4 and the resource allocation set of the new BS is not a null set and the intersection include two elements corresponding to the "B and D" resource allocations. That is, a number of elements of the intersection is the same as k (k=2). In this case, the "k" type resources cannot be used for the connection between the new BS and BS4 anymore. Accordingly, the new BS determines to connect the BSs by using the "k+1" type resources.

When the determination is made as described above, the new BS may directly allocate resources for all the BSs according to the "k+1" type or may make a request for resource allocations for the BSs to a separate network entity or a system operator.

Resource allocations of the new BS and the neighboring BSs in an environment where there is no BS managing server are stopped by the following conditions. When the new BS does not receive the NDS even though the new BS having transmitted the NDR a predetermined number of times corresponding to N times, the new BS considers that there is no neighboring BS anymore and stops the resource allocating operation. Further, when the new BS uses all RF chains which the new BS has for connections with the neighboring BSs, the new BS determines that a connection with an additional neighboring BS is not possible anymore and stops an attempt the connection with the neighboring BS.

Figure 20:
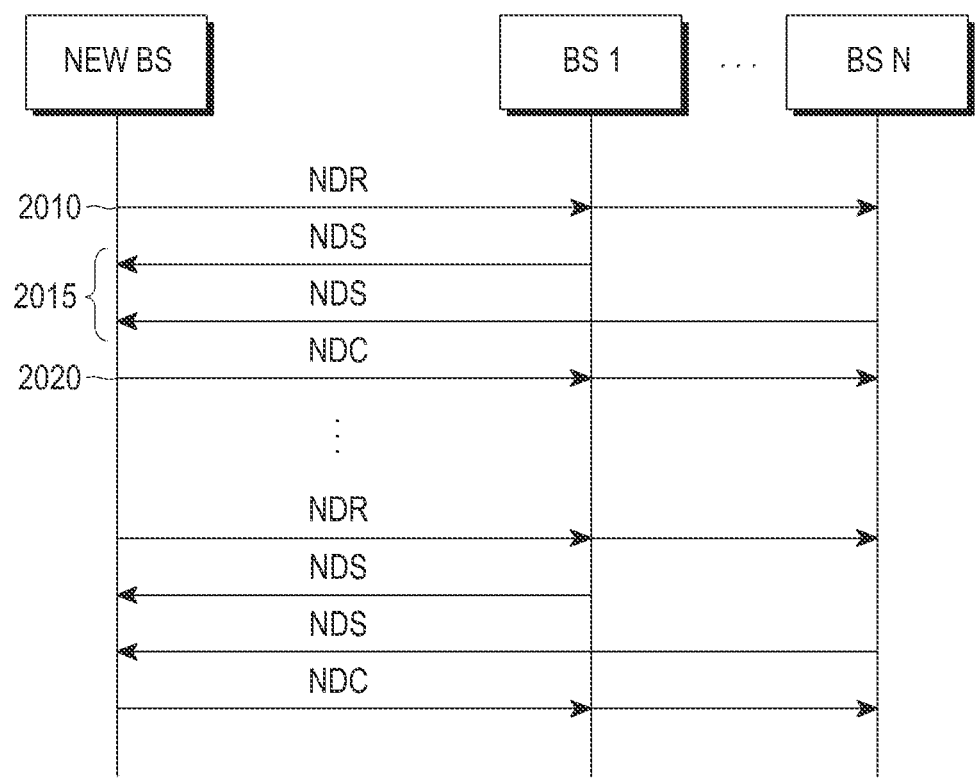
FIG. 20 is a message flow chart illustrating an operation in which a new BS allocates resources for communication between BSs according to an embodiment of the present disclosure.

FIG. 20 is a message flow chart illustrating an operation in which a new BS allocates resources for the communication between BSs according to an embodiment of the present disclosure. Referring to FIG. 20, in operation 2010, the new BS broadcasts the NDR message to random neighboring BSs by using predetermined time and/or frequency resources. For example, the NDR may be transmitted to the neighboring BSs for the request window of the already known neighbor detection phase. In operation 2015, the neighboring BSs of the new BS receive the NDR message and transmit the NDS messages in response to the NDR message. Due to various factors such as a distance between each of the BSs and the new BS and a capability of the neighboring BS, the NDS messages from the neighboring BSs arrive at the new BSs at different times. The new BS allocates resources for a connection with the neighboring BS (BS1 in the illustrated example) having transmitted the NDS message which has first arrived.

In operation 2020, the new BS transmits the NDC message including information on the resources allocated to BS 1. The NDC message may be received by the neighboring BSs, particularly, BS1, and BS1 may know radio resources to be used for the connection with the new BS from the information included in the NDC message.

Thereafter, the new BS transmits the NDR message again and the neighboring BSs transmit the NDS messages in response to the NDR message. In an embodiment, BS1 having already received the resource allocation from the new BS may not transmit the NDS message again. In another embodiment, BS1 transmits the NDS message and the new BS selects a neighboring BS to which the new BS secondly allocates resources based on the NDS message which has first arrived among the NDS messages from the remaining neighboring BSs except for BS1. Similarly, the NDC indicating the allocated resources is transmitted to the neighboring BSs by the new BS. The aforementioned processes are repeated until the resource allocations for all the neighboring BSs or until the new BS has no more available RF chains.

Figure 21:
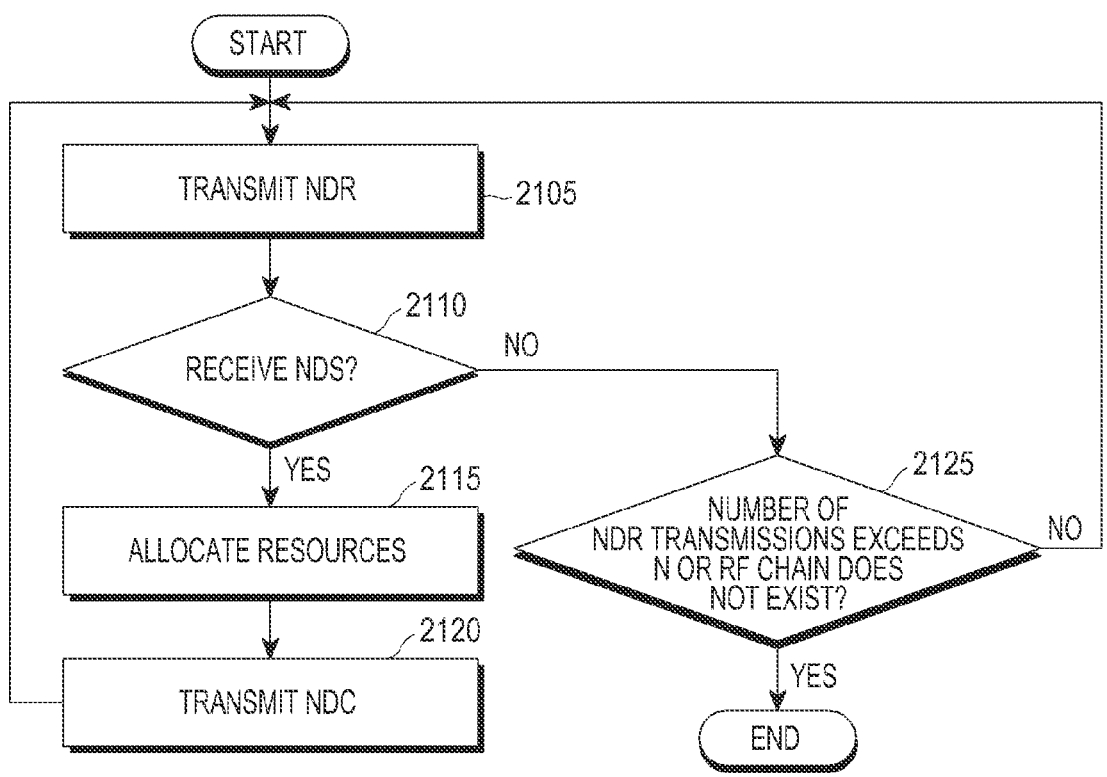
FIG. 21 is a flowchart illustrating a resource allocating process for communication between BSs of a new BS according to an embodiment of the present disclosure.

FIG. 21 is a flowchart illustrating a resource allocating process, for communication between BSs, of a new BS according to an embodiment of the present disclosure.

Referring to FIG. 21, in operation 2105, the new BS is initially installed, recognizes a necessity to allocate resources for communication between BSs while being turned on, and broadcasts the NDR message to known neighboring BSs through predetermined time and/or frequency resources. The NDR message includes at least one of RF chain information and position information of the new BS, for example, information configured as shown in FIG. 6. In operation 2110, the new BS detects a first received NDS message after transmitting the NDR message. The NDS message includes at least one of a BS ID of the neighboring BS having transmitted the NDS message, RF chain information, information on connections with other BSs, and used resource allocation information, for example, information configured as illustrated in FIG. 7.

The new BS determines resource allocation for the neighboring BS having transmitted the NDS message according to at least one of the aforementioned various embodiments in operation 2115, and generates and transmits the NDC message indicating the determined resource allocation in operation 2120. The NDC message includes at least one of a BS ID of the new BS, information on RF chains used for a connection with the neighboring BS, a BS ID of the neighboring BS, and information indicating the resource allocation used for the connection with the neighboring BS, for example, information configured as illustrated in FIG. 7. After the NDC message is transmitted, the new BS returns to operation 2105.

Meanwhile, when the new BS does not receive the NDS message from the neighboring BS, before a timeout is generated, in operation 2110, the new BS determines whether a number of times that the new BS transmits the NDR message exceeds a predetermined number N or whether all the possessed RF chains have been used for connections with the neighboring BSs, in operation 2125. When the number of times that the BS transmits the NDR message exceeds N, the new BS stops the resource allocating operation. Further, when there are no more RF chains which can be used for the connection with the neighboring BS, the new BS stops the resource allocating operation. In contrast, when the number of times that the new BS transmits the NDR message does not exceed N and there are available RF chains, the new BS returns to operation 2105 to further transmit the NDR message.

Figure 22:
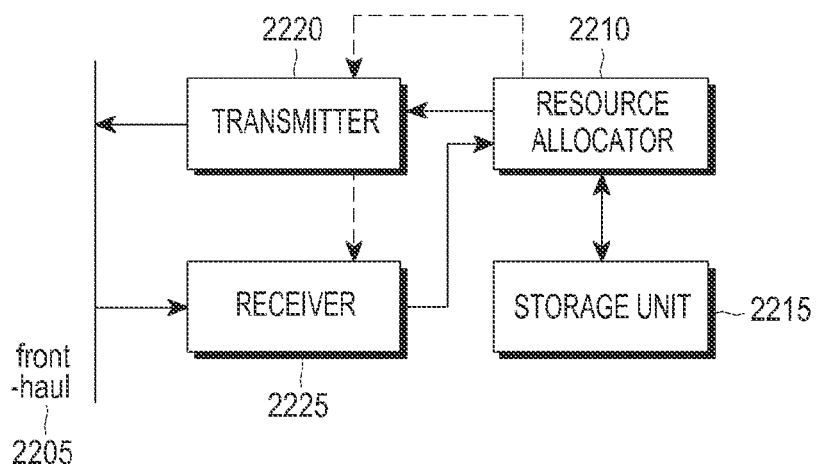
FIG. 22 is a block diagram illustrating a simplified configuration of a BS which allocates communication resources between BSs according to an embodiment of the present disclosure.

FIG. 22 is a block diagram illustrating a simplified configuration of a BS which allocates communication resources between BSs according to an embodiment of the present disclosure.

Referring to FIG. 22, the BS includes a transmitter 2220 and a receiver 2225 that perform communication between BSs through a front-haul 2205, a resource allocator 2210, and a storage unit 2215. The transmitter/receiver 2220/2225 is configured to exchange signals with neighboring BSs through wires or wirelessly. The transmitter 2220 may transmit the NDR message and the NDC message to the neighboring BSs and the receiver 2225 may receive the NDS message from the neighboring BSs.

The resource allocator 2210 generates the NDR message, transmits the generated NDR message through the transmitter 2220, determines resource allocation for communication with the corresponding neighboring BS based on the received NDS message, and transmits the NDC message indicating the determined resource allocation through the transmitter 2220. A resource allocation scheme, and an algorithm and parameters for determining the resource allocation are stored in the storage unit 2215.

According to the various embodiments of the present disclosure performed as described above, efficient communication between BSs is possible in a case where a plurality of BSs simultaneously provide services to a terminal without passing through a core network. Further, since each of the BSs does not need excessive hardware for the communication between BSs, each BS can dynamically or adaptively provide the service.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of allocating resources for communication between base stations (BSs), the method comprising:
   determining, neighboring BSs of a new BS based on position information of the new BS and position information of existing BSs in a network;
   determining a second resource allocation scheme for the new BS and the neighboring BSs based on a first resource allocation scheme applied to the existing BSs in the network and a number of resource configurations used by the neighboring BSs; and
   allocating, resources for communication between the new BS and the neighboring BSs by using the determined second resource allocation scheme.

2. The method of claim 1, wherein the first resource allocation scheme includes k sub-type resources and the second resource allocation scheme includes k+1 sub-type resources, k being an integer greater than or equal to 1, and each of the sub-type resources includes a pair of resources including two frequency bands each to be used for communication between two BSs within one time division interval and different sub-type resources include resources of different time division intervals.

3. The method of claim 2, wherein the determining of whether to use the second resource allocation scheme comprises:
  determining to use the first resource allocation scheme if the number of resource configurations used by the neighboring BSs is equal to or smaller than 2k−1; and
  determining to use the second resource allocation scheme if the number of resource configurations used by the neighboring BSs is 2k.

4. The method of claim 3, wherein each of the resource configurations is expressed by a combination including k resources included in different sub-type resources of the first resource allocation scheme.

5. The method of claim 2, wherein the allocating of the resources comprises:
  selecting one of neighboring BSs to be connected with the new BS as a reference BS;
  allocating odd numbered sub-type resources to a link between BSs connected in a radial direction from the reference BS; and
  allocating even numbered sub-type resources to a link between BSs connected in a circulation direction from the reference BS.

6. The method of claim 2, further comprising:
  determining, if a removal of at least one BS is detected, a number of sub-type resources used by remaining BSs;
  allocating, if the remaining BSs use k−i, where i=1, 2, . . . k−1, sub-type resources, resources of the remaining BSs by using the k−i sub-type resources; and
  maintaining, if the remaining BSs use k sub-type resources, resource allocations of the remaining BSs.

7. An apparatus for allocating resources for communication between base stations (BSs), the apparatus comprising:
  a transceiver configured to:
    receive a resource allocation request including position information from a new BS, and
    transmit resource allocation information to the new BS or to the new BS and existing BSs in a network;
  a storage unit configured to store resources and position information of the new BS and the existing BSs in the network; and
  a resource allocator configured to:
    determine neighboring BSs of the new BS based on the position information of the new BS and the position information of the existing BSs in the network,
    determine a second resource allocation scheme for the new BS and the neighboring BSs based on a first resource allocation scheme applied to the existing BSs in the network and a number of resource configurations used by the neighboring BSs, and
    allocate resources for communication between the new BS and the neighboring BSs by using the determined second resource allocation scheme.

8. The apparatus of claim 7, wherein the first resource allocation scheme includes k sub-type resources and the second resource allocation scheme includes k+1 sub-type resources, and each of the sub-type resources includes a pair of resources including two frequency bands each to be used for communication between two BSs within one time division interval and different sub-type resources include resources of different time division intervals.

9. The apparatus of claim 8, wherein the resource allocator is further configured to:
  determine to use the first resource allocation scheme if the number of resource configurations used by the neighboring BSs is equal to or smaller than 2k−1, and
  determine to use the second resource allocation scheme if the number of resource configurations used by the neighboring BSs is 2k.

10. The apparatus of claim 9, wherein each of the resource configurations is expressed by a combination including k resource allocations included in different sub-type resources of the first resource allocation scheme.

11. The apparatus of claim 8, wherein the resource allocator is further configured to:
  select one of neighboring BSs to be connected with the new BS as a reference BS,
  allocate odd numbered sub-type resources to a link between BSs connected in a radial direction from the reference BS, and
  allocate even numbered sub-type resources to a link between BSs connected in a circulation direction from the reference BS.

12. The apparatus of claim 8, wherein the resource allocator is further configured to:
  determine, if a removal of at least one BS is detected, a number of sub-type resources used by remaining BSs,
  allocate, if the remaining BSs use k−i, where i=1, 2, . . . k−1, sub-type resources, resource allocations of the remaining BSs by using the k−i sub-type resources, and
  maintain, if the remaining BSs use k sub-type resources, resource allocations of the remaining BSs.

13. A method of allocating resources for communication between base stations (BSs), the method comprising:
  transmitting, from a new BS, a request message including position information of a new BS to neighboring BSs;
  receiving a response message corresponding to the request message from a first BS of the neighboring BSs;
  allocating resources to be used for a connection between the first BS and the new BS based on a resource set of the first BS and a resource set of the new BS; and
  transmitting a confirm message indicating the determined resource to the first BS.

14. The method of claim 13, wherein the allocating of the resources comprises at least one of:
  selecting, if an intersection between the resource set of the first BS and the resource set of the new BS is empty and the resource set of the new BS is empty, one resource from the resource set of the first BS;
  selecting, if the intersection between the resource set of the first BS and the resource set of the new BS is empty and the resource set of the new BS is not empty, one resource from the resource set of the new BS;
  selecting, if a number of resources included in the intersection between the resource set of the first BS and the resource set of the new BS is larger than 0 and smaller than k and there are one or more resource configurations which are not included in the intersection, one of the resources which are not included in the intersection, k referring to a type of resource used by the neighboring BSs;
  selecting, if the number of resources included in the intersection between the resource set of the first BS and the resource set of the new BS is larger than 0 and smaller than k and there is no resource configuration which is not included in the intersection, a resource of a different sub-type from the resources of the intersection; and changing, when the number of resources included in the intersection between the resource set of the first BS and the resource set of the new BS is k, resources of the new BS and the neighboring BSs to a "k+1" type.

15. An apparatus for allocating resources for communication between base stations (BSs), the apparatus comprising:
a transceiver configured to:
   transmit a request message including position information of a new BS to neighboring BSs, and
   receive a response message corresponding to the request message from a first BS of the neighboring BSs; and
a resource allocator configured to:
   allocate resources to be used for a connection between the first BS and the new BS based on a resource set of the first BS and a resource set of the new BS, and
   transmit a confirm message indicating the determined resource to the first BS.

16. The apparatus of claim 15, wherein the resource allocator performs at least one of processes of:
   selecting, if an intersection between the resource set of the first BS and the resource set of the new BS is empty and the resource set of the new BS is empty, one resource from the resource set of the first BS;
   selecting, if the intersection between the resource set of the first BS and the resource set of the new BS is empty and the resource set of the new BS is not empty, one resource from the resource set of the new BS;
   selecting, if a number of resources included in the intersection between the resource set of the first BS and the resource set of the new BS is larger than 0 and smaller than k and there are one or more resource configurations which are not included in the intersection, one of the resources which are not included in the intersection, k referring to a type of resource used by the neighboring BSs;
   selecting, if the number of resources included in the intersection between the resource set of the first BS and the resource set of the new BS is larger than 0 and smaller than k and there is no resource configuration which is not included in the intersection, resource of a different subtype from the resource of the intersection; and
   changing, if the number of resources included in the intersection between the resource set of the first BS and the resource set of the new BS is k, the resources of the new BS and the neighboring BSs to a "k+1" type.

* * * * *